United States Patent
Knoblock et al.

[11] Patent Number: 5,991,759
[45] Date of Patent: *Nov. 23, 1999

[54] METHOD AND SYSTEM FOR DEFINING EQUIPMENT IN A TELECOMMUNICATION NETWORK DOWN TO THE RACKFACE LEVEL

[75] Inventors: Terry Knoblock, Wylie; Gregory G. Carlson, Plano; Paul Michael Golobay, Farmers Branch, all of Tex.

[73] Assignee: MCI Communications Corporation, Washington, D.C.

[*] Notice: This patent is subject to a terminal disclaimer.

[21] Appl. No.: 08/823,556

[22] Filed: Mar. 25, 1997

[51] Int. Cl.$^6$ ................................................ G06F 15/173
[52] U.S. Cl. ..................... 707/10; 707/104; 395/200.31; 395/200.47; 395/200.5; 395/200.53
[58] Field of Search .................. 707/10, 104; 395/200.5, 395/200.31, 200.47, 200.53; 370/254; 379/220

[56] References Cited

U.S. PATENT DOCUMENTS

| | | | |
|---|---|---|---|
| 5,426,674 | 6/1995 | Nemirovsky et al. | 395/200.71 |
| 5,513,171 | 4/1996 | Ludwiczak et al. | 370/254 |
| 5,515,524 | 5/1996 | Lynch et al. | 395/500 |
| 5,630,025 | 5/1997 | Dolby et al. | 706/46 |
| 5,630,072 | 5/1997 | Dobins | 705/22 |
| 5,664,170 | 9/1997 | Taylor | 395/200.5 |
| 5,758,351 | 5/1998 | Gibson et al. | 707/104 |
| 5,764,955 | 6/1998 | Doolan | 395/500 |
| 5,774,689 | 6/1998 | Curtis et al. | 395/500 |
| 5,786,998 | 7/1998 | Neeson et al. | 701/35 |
| 5,802,144 | 9/1998 | Laird | 379/32 |

OTHER PUBLICATIONS

Don Burgio, MCI Telecommunications Corporation, *MCI SIteVu*, copyright 1996, made available to the public Apr. '96.

*Primary Examiner*—Jean Raymond Homere

[57] ABSTRACT

A system and method is provided for defining equipment, in terms of components, such as modules, shelves and racks, down to the rackface level to be used for recording data related to the configuration of equipment within field sites. Once components are defined and stored in a database, they are configured by specifying interrelationships between components. Accordingly, shelves are configured by populating them with modules. Likewise, racks are configured by populating them with configured shelves. Graphical tools can be used to assist the user in configuring components. Data related to components, and configured equipment are stored in a central database.

23 Claims, 34 Drawing Sheets

| FIG. 10C | FIG. 10F | FIG. 10I | FIG. 10L |
|---|---|---|---|
| FIG. 10D | FIG. 10G | FIG. 10J | FIG. 10M |
| FIG. 10E | FIG. 10H | FIG. 10K | FIG. 10N |

FIG. 10B

Power Tables

Version Tables

METHOD AND SYSTEM FOR DEFINING EQUIPMENT IN A TELECOMMUNICATION NETWORK DOWN TO THE RACKFACE LEVEL

CROSS-REFERENCE TO OTHER APPLICATIONS

The following applications of common assignee contain some common disclosure as the present application:

U.S. patent application Ser. No. 08/823,557; Filing Date: Mar. 25, 1997 entitled "System and Method for Recording, Maintaining and Viewing Configuration and Placement of Equipment in Field Sites", filed concurrently herewith.

U.S. patent application Ser. No. 08/823,561; Filing Date: Mar. 25, 1997 entitled "System and Method to Automate Equipment Placement at Remote Sites", filed concurrently herewith.

U.S. patent application Ser. No. 08/823,555; Filing Date: Mar. 25, 1997 entitled "Web Based System and Method to Automate Storage of Power Supply Data and Calculation of Battery Reserves", filed concurrently herewith.

U.S. patent application Ser. No. 08/823,762; Filing Date: Mar. 25, 1997 entitled "Enhanced System and Method for Report Generation", filed concurrently herewith.

U.S. patent application Ser. No. 08/823,558; Filing Date: Mar. 25, 1997 entitled "Method for Organizing a Relational Database Used for Storing Data Related to the Configuration and Placement of Equipment in Field Sites", filed concurrently herewith.

The above-listed applications are incorporated herein by reference in their entireties.

BACKGROUND OF THE INVENTION

1. Field of the Invention

The present invention relates generally to telecommunication equipment, and more specifically to a system and method for defining equipment down to the rackface level to be used for recording data related to the configuration of equipment within field sites.

2. Related Art

A long distance telecommunications service provider (hereinafter "service provider"), typically maintains billions of dollars worth of network assets. The majority of such network assets are typically installed in numerous field sites located throughout a vast geographical region that encompasses a long distance telephone network. For example, MCI maintains billions of dollars worth of transmission and power equipment located in hundreds of remote field sites throughout North America.

Typically, much of the network equipment is arranged and mounted in equipment bays. Such equipment bays are typically organized as a plurality of side-by-side racks, each having a plurality of top-to-bottom shelves, wherein each shelf contains a plurality of vertically positioned slots. Circuit cards are typically installed in the vertically positioned slots. In addition, other types of modules are installed on the shelves.

Conventionally, it has been difficult for service providers to maximize the use of space within remote sites. Typically, site planners design the layout of remote sites down to the rack or "footprint" level. These plans are then used by engineering groups to design the layout of each rack at the "rackface" level. That is, the engineering groups arrange the shelves within each rack, and the cards and other modules within each shelf.

In addition, changes to the configuration of racks at the rackface level are often made by field engineering groups that respond to onsite equipment change requirements. Such changes occur often in the ordinary course of business.

However, it is often the case, that changes made in the field are not recorded. Consequently, site planners and other groups do not necessarily have access to accurate and updated information pertaining to the layout and configuration of equipment within remote sites. This makes it very difficult for site planners and other groups to plan ahead for future changes and maximize the use of the available space with remote sites. It also makes it difficult for power engineers to accurately estimate the ongoing and changing power requirements for remote sites. This can cause unwanted delays and down times due to inadequate power reserves.

In addition, the conventional method of site planning down to the rack footprint level has proven inadequate. For example, it is often necessary for engineers to determine the precise component parts that make up particular equipment racks in order to calculate power requirements for future planning purposes and the like. Engineers and other groups such as material management groups, often need accurate data at a more detailed level than provided by conventional methods.

Further, when interchangeable pieces of equipment are swapped out of equipment racks, interested parties need to know the details of the swap. Similarly, when planning rackface configurations to maximize both network traffic flow and floor space utilization, planners need to know the details of the components down through the rack, shelf and module level. In addition, site planners need to know when rack components are brought on-line. This information is required for power equipment in addition to transmission equipment. Further, it is would be very useful for site engineers to know exactly when installed equipment becomes decommissioned. This would allow much greater flexibility for future planning of remote sites.

SUMMARY OF THE INVENTION

Accordingly, the present invention is directed toward a system and method for defining equipment down to the rackface level to be used for recording data related to the configuration of equipment within field sites. In a preferred embodiment, the present invention works in combination with a system and method for recording, maintaining and viewing information related to the placement and configuration of equipment in field sites. An example of such a system and method can be found in the above referenced U.S. patent application entitled "System and Method for Recording, Maintaining and Viewing Configuration and Placement of Equipment in Field Sites".

Accordingly, an implementation of the present invention provides a means for defining equipment down to the rackface level, including modules, shelves and rails. Specifically, an implementation of the present invention provides a means for defining equipment, including modules, shelves and rails. Such components are stored in a database that is conceptually referred to herein as the "product catalog". Rails as defined herein, are empty or raw racks that are stored in the product catalog. Preferably, detailed information pertaining to each component stored in the product catalog is entered by an administrator during a data entry phase. Generally, such information includes identifying information, physical attributes, electrical and connection type attributes and status data.

For example, in a preferred embodiment, identifying information includes a manufacture's name, model, and description. Preferably, such information is taken directly from the manufacture's data sheet or the like. In addition, identifying information can include a unique part number provided by the service provider, and classifications and/or subclassifications for each component. Physical attributes include for example, quantities for height, weight and depth. Electrical data includes the type of voltage, such as direct current (DC), single phase alternating current (AC1), and three phase alternating current (AC3). In addition, electrical data includes a quantity of amps, watts and voltages typically drawn by the module.

For shelves, connection attributes can include information such as the number of wire, fiber optic, and/or coaxial connections. Status information preferably includes for example a flag to indicate whether or not the component specification is complete, incomplete or waiting for approval from a component approval group or the like.

In addition, an implementation of the present invention provides users with a means for configuring equipment from components within the product catalog. Such configured equipment is stored in a portion of the database that is conceptually referred to herein as the "configuration library". Accordingly, after components (i.e. modules, rails and shelves) have been defined via a data entry process, as described above, they are used to configure equipment. In a system included in the preferred embodiment, equipment configuration is a precursor to equipment placement as described below.

Accordingly, users configure shelves by populating them with modules. Preferably, this is accomplished by selecting a shelf from the product catalog and adding one or more modules thereto. Modules are added by selecting pre-defined modules from the product catalog. It should be noted that in a preferred embodiment, configured shelves may also comprise monolithic shelves (i.e. raw or empty shelves that have not been populated). As described below, configured shelves are used to populate rails.

In a preferred embodiment of the present invention, users populate configured shelves by defining interrelationships between modules and shelves by directly manipulating graphical representations of the selected shelves and modules. For example, in one implementation, users "drag" graphical representations of selected modules and "drop" them on particular locations within graphical representations of the selected shelves. Preferably, a mouse or other pointing device is used to accomplish this task. After one or more shelves are populated in this manner, they are typically provided with a unique name and stored in the configuration library.

Configured shelves and are used to create configured racks. Configured racks are created by selecting a pre-defined rail from the product catalog. After a rail has been selected, it is populated with configured shelves that have been stored in the configuration library, as described above. In a preferred embodiment of the present invention, users specify an interrelationship between configured shelves and selected racks by directly manipulating graphical representations of the selected configured shelves and rails. For example, in one implementation, users "drag" graphical representations of selected configured shelves and "drop" them in particular locations within a graphical representation of the selected rail.

In addition, a system that is preferably used in combination with the present invention, can be used to place configured racks from the configuration library in particular locations within remote sites. An example of such a system and method can be found in the above referenced U.S. patent application entitled "A System and Method To Automate Equipment Placement In Remote Sites".

A rack that is placed in a particular location within a remote site is referred to herein as creating a "footprint." Such footprints are stored in a portion of the database that is conceptually referred to herein as the "placement library." Accordingly, after rails are configured with configured shelves, as described above, they are placed in a particular location within a field site, as defined in the placement library.

It should be noted that in a system included in the preferred embodiment of the present invention, generic racks can also be used to create footprints. Generic racks are defined herein as configured racks that have no specific manufacturer associated with them. In addition, generic racks are of the monolithic variety in that they are not populated with shelves and modules. Because both generic racks and manufacturer specific racks are configured racks, they can be placed in field sites to create a footprint therein.

Placing generic racks in field sites is useful for staging the planning and placement of equipment in remote sites. For example, the generic rack placement feature of the present invention, can be used by facility planning groups to generally configure and reserve floor space for particular types of equipment. Each generic rack placed in a field has a particular equipment class and sub-class associated with it. Inevitably, such generic racks are typically replaced with manufacturer specific racks by engineering groups or the like. In a preferred embodiment, manufacturer specific racks must be of the same equipment class and subclass as the generic racks they are replacing. In this manner, the present invention provides a high degree of control that can be used for example, to assure that the site plans of the facility planning groups are followed.

In a preferred embodiment, a site hierarchy is created prior to creating footprints. Preferably, hierarchies are created via a data entry process provided by an implementation of the present invention. Data related to site hierarchies are stored in a portion of the database that is conceptually referred to herein as the "site hierarchy repository". An example of a site hierarchy that can be used in an embodiment of the present invention is the hierarchy of: site, structure (or building), floor, zone, planning unit, row and row segment.

In a preferred embodiment, some of levels of the site hierarchy have a particular shape and dimension associated with them. Specifically, in a preferred embodiment, each floor, zone, planning unit and row segement is graphically represented by a closed polygonal shape. Further, in a system included in the preferred embodiment, graphical representations of these levels of the site hierarchy are used to generate a composite representation of remote sites.

In addition, as described below, architectural drawings (also referred to herein as "floor-plan drawings") can be used as an underlay for the composite graphical representation of a floor in a remote site. That is, a graphical representation of pre-defined site hierarchy levels are rendered on top of such floor-plan drawings. In addition, floor-plan drawings can be used by an administrator as an outline to define the site hierarchy levels.

Once site hierarchy levels are defined for a particular floor within a particular site, footprints can be created therein. As stated, a footprints are created by placing racks in a particular location within a remote site. Specifically, racks are placed in row segments. A particular row segment is selected by specifying values from the site hierarchy repository, as previously described.

Note that in a system included in the preferred embodiment, the first three levels of the site hierarchy, namely the site, structure and floor hierarchy levels, are defined via a non-graphical component of the present invention referred to herein as the administrative tool. In contrast, a graphical portion of the floor hierarchy level, and the planning unit and row segment hierarchy levels, are graphically specified via a graphical component of the present invention referred to herein as the placement tool.

Accordingly, in a system included in the preferred embodiment, the site, building and floor levels of the site hierarchy are specified by having the user select values from pre-defined pick lists. That is, the user first selects a site from the site pick list. The site pick list comprises a list of pre-defined sites from the site hierarchy repository. A selection of a particular site causes another pick list to be displayed comprising a list of buildings within the selected site. Once the user selects a particular building from the building pick list, the user is presented with another pick list comprising a list of floors within the selected building.

Once a floor is selected from the floor pick list, the user is presented with a graphical representation of the selected floor. From there, the user can graphically zoom-in a particular row segment and select it. Once a row segment is selected the user can place a rack in a particular location within the row segment. Thus, a footprint is created and the database is updated accordingly.

BRIEF DESCRIPTION OF THE FIGURES

The present invention will be described with reference to the accompanying figures, wherein.

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

Figure 1A:
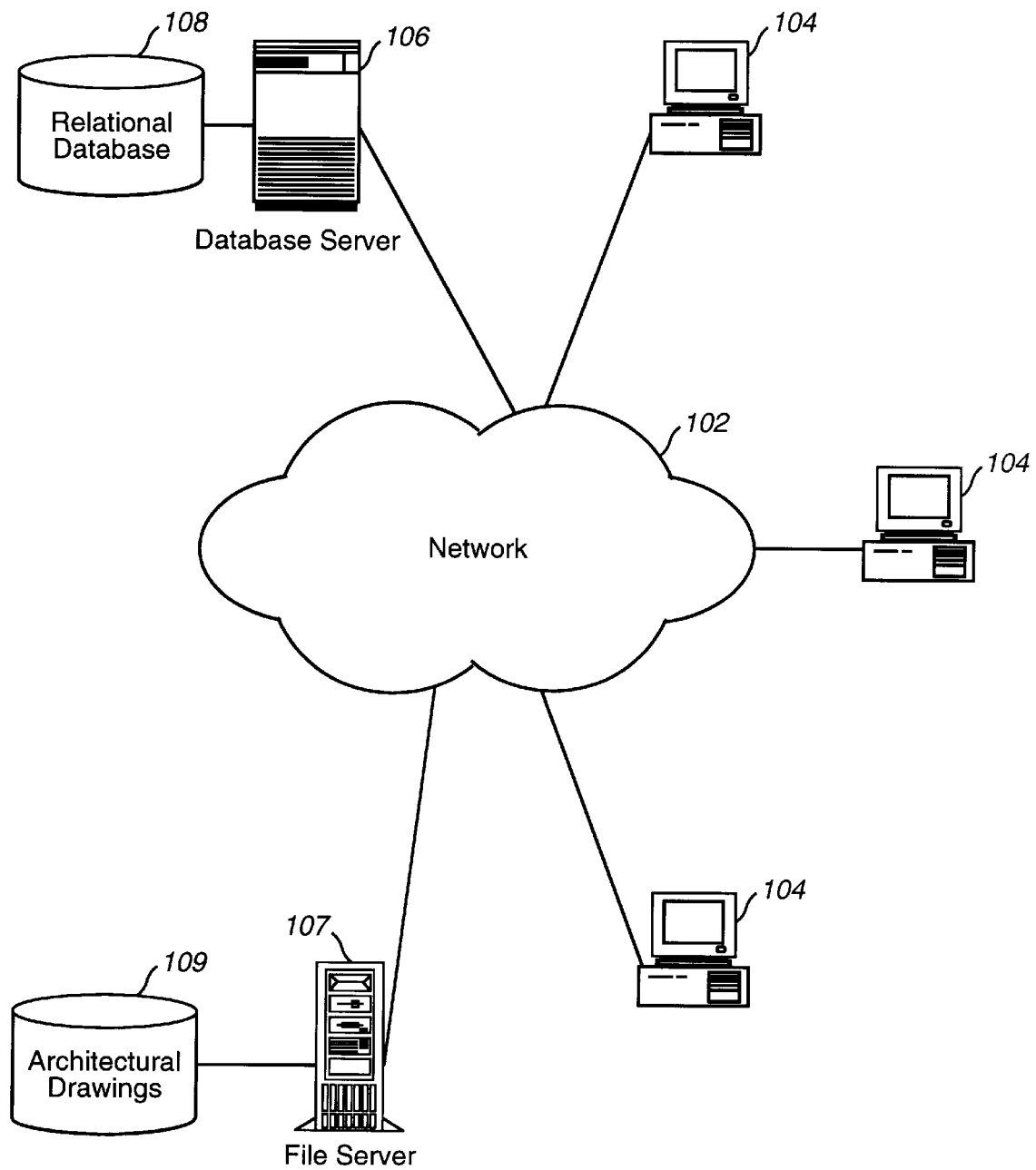
FIG. 1A is a block diagram depicting an operational environment according to a preferred embodiment of the present invention.

The present invention is directed toward a method for organizing a database used for storing data related to the configuration and placement of equipment in field sites.

The present invention is described in terms of a preferred embodiment. Specifically, the present invention is described in terms of an application program that works in combination with a database that is organized according to the principles disclosed herein. Specifically, a preferred embodiment of the present invention works in combination with a system and method for recording, maintaing and viewing information related to the placement and configuration of equipment in field sites. An example of such a system and method can be found in the above referenced U.S. patent application entitled "System and Method for Recording, Maintaining and Viewing Configuration and Placement of Equipment in Field Sites".

The specific example of such a system used herein is an application program referred to as "SiteVu". In this example, SiteVu is used to record, maintain and view the configuration and placement of equipment in field sites for a telecommunications service provider. The description in such terms is provided for convenience only. It is not intended that the invention be limited to this example embodiment. For example, the present invention can be used to support other types of equipment for industries other than the telecommunications industry. In fact, after reading the following description, it will become apparent to persons skilled in the relevant art(s) how the implement the present invention in alternative embodiments.

The following sections are presented for the purpose of introducing and defining some of the terms and concepts used throughout this disclosure to describe the present invention. A more detailed description of each of these concepts is subsequently described below.

The present invention provides a means for defining equipment, including modules, shelves and rails. Such components are stored in a portion of a database that is conceptually referred to herein as the product catalog. Rails are empty or raw racks. Shelves are mounted on rails. Modules are components that are installed in shelves. Examples of modules include circuit cards that are mounted in slots within shelves, and computer terminals that are placed on top of shelves.

In contrast, configured equipment (namely, racks and configured shelves) are stored in a portion of a database that is conceptually referred to herein as the configuration library. The configuration library stores configured shelves and racks. Configured racks include generic racks and manufacturer specific racks. Manufacturer specific racks can be monolithic. A monolithic rack lacks detailed information about the shelves comprising the rack. Likewise, a configured shelf can be monolithic. A monolithic shelf lacks detailed information about the modules comprising the shelf.

Racks can be placed in specific locations within remote sites. A footprint is the union of a configured rack and a specific location in a remote site. Footprint information is stored in a portion of a database conceptually referred to herein as the placement library.

Remote site locations are defined in terms of a site hierarchy, comprising the following levels: site, structure, floor, zone, planning unit, row and row segment. This information is stored in a portion of a database conceptually referred to herein as the site hierarchy repository.

FIG. 1A is a block diagram depicting a typical operational environment according to a preferred embodiment of the present invention. A network 102 is depicted in the center of the drawing in FIG. 1A. The network 102 represents any type of computer and/or telecommunications network or combination thereof, that can be used to couple a plurality of workstations 104 with a relational database 108. As described below, all of the features of the SiteVu tool can be implemented with a relational database, such as the database 108, that is organized according to the novel principles disclosed herein. In this example, each workstation 104, is a general purpose computer system that executes software (referred to herein as "SiteVu"), that causes the computer system 104 to perform the functions as described herein.

In one embodiment of the present invention, the network 102 can be a company wide intranet. In other embodiments, local area networks (LANs), or wide area networks(WANs), (such as multiple LANs linked together with bridges, routers or the like), can be used as the network 102. In addition, the network 102 can include the use of switched networks, and other forms of common carrier transmission lines and equipment that can link remote computers, such as the remote workstations 104, to the relational database 108.

Also depicted in the example environment shown in FIG. 1A is file server 107 and a storage device comprising architectural drawings 109. In a system included in the preferred embodiment, each computer system 104 executes software that performs computer aided drafting and design (CADD) functions. As described below, the CADD software is controlled by the SiteVu program in a system included in the preferred embodiment of the present invention. In this example, architectural drawings may be stored on local storage devices in each of the workstations 104, or in a central file server, such as the file server 107. This aspect of the present invention will be described below.

In this example the relational database 108 is coupled with a database server 106. In a system included in the preferred embodiment, the relational database is implemented using an Oracle relational database, supplied by Oracle Corporation. In addition, the database server 106 is a DEC Alpha 2100, manufactured by Digital Equipment Corporation. Further, Microsoft Windows®, manufactured by Microsoft Corporation can be used as the operating system for the computer systems 104 used to execute the SiteVu and the CADD programs. Finally, in a system included in the preferred embodiment, the CADD program used is Microstation CADD, manufactured by Bentley Systems, Inc.

FIGS. 1B–1H depicts an example of an architecture of the SiteVu program, according to a preferred embodiment of the present invention. Specifically, FIGS. 1B–1G describe an example of SiteVu components and their associated inputs and outputs.

Figure 1B:
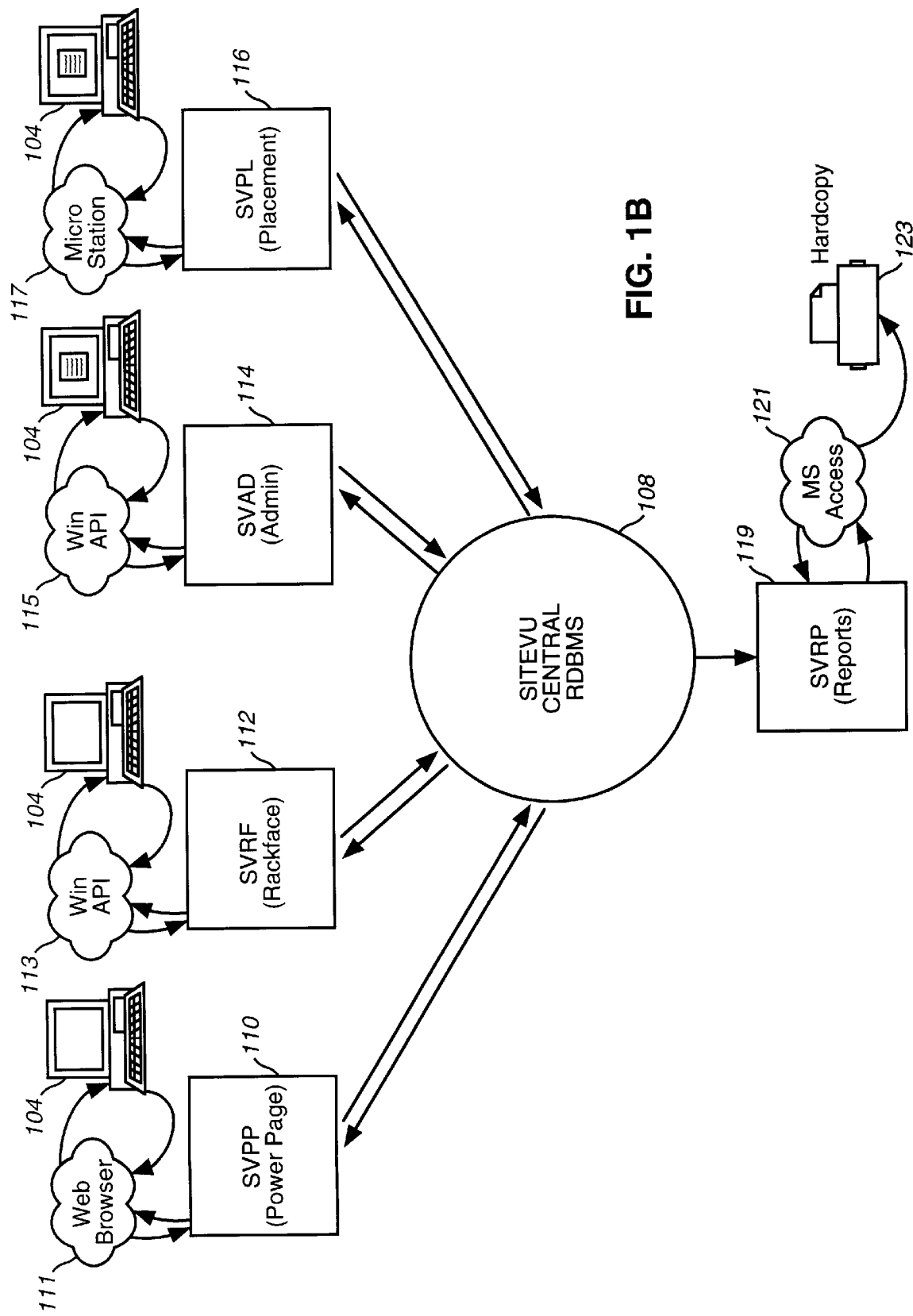
FIGS. 1B–1G are block diagrams depicting various functional components according to a preferred embodiment of the present invention.
Figure 1C:
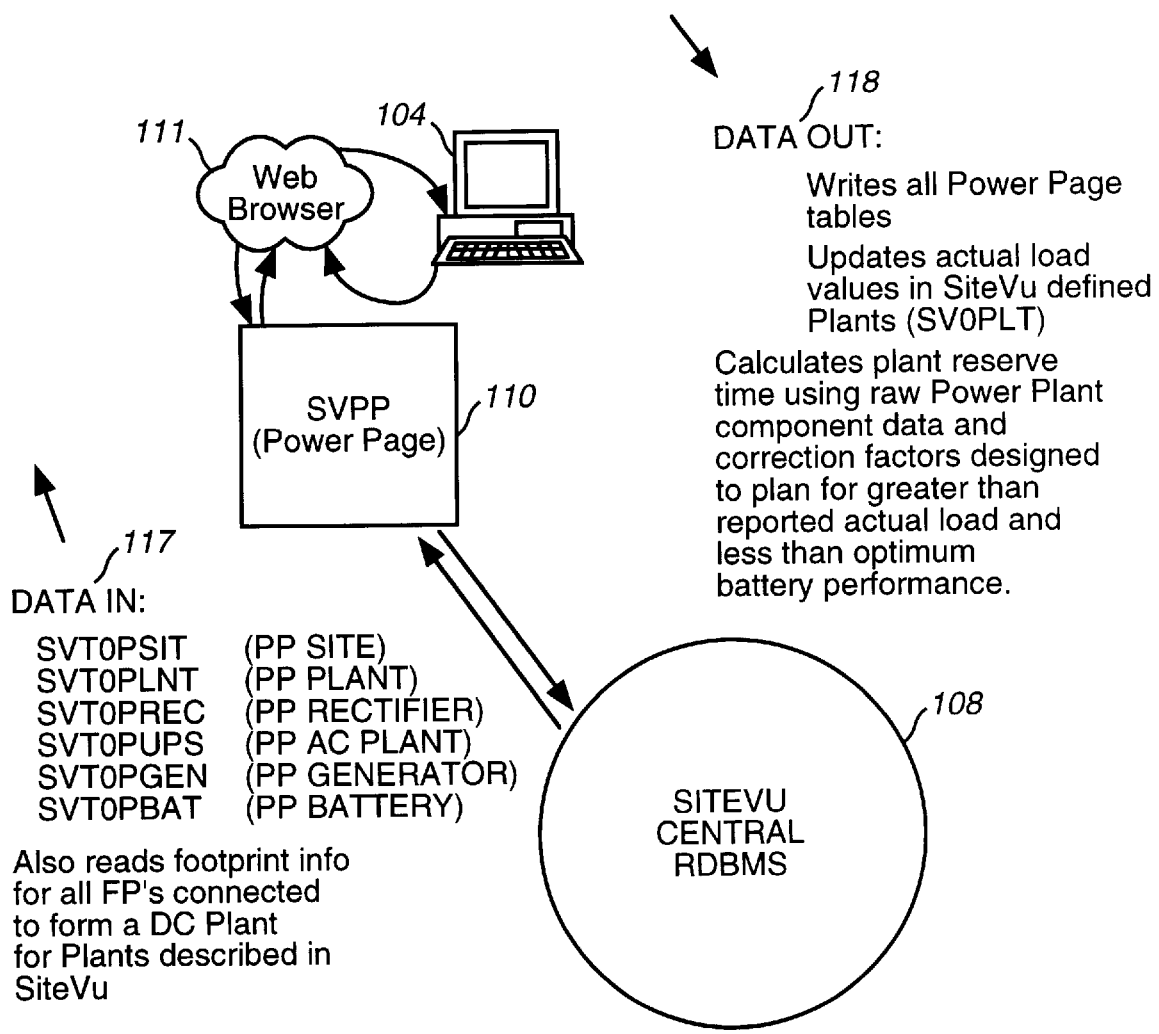
Figure 1D:
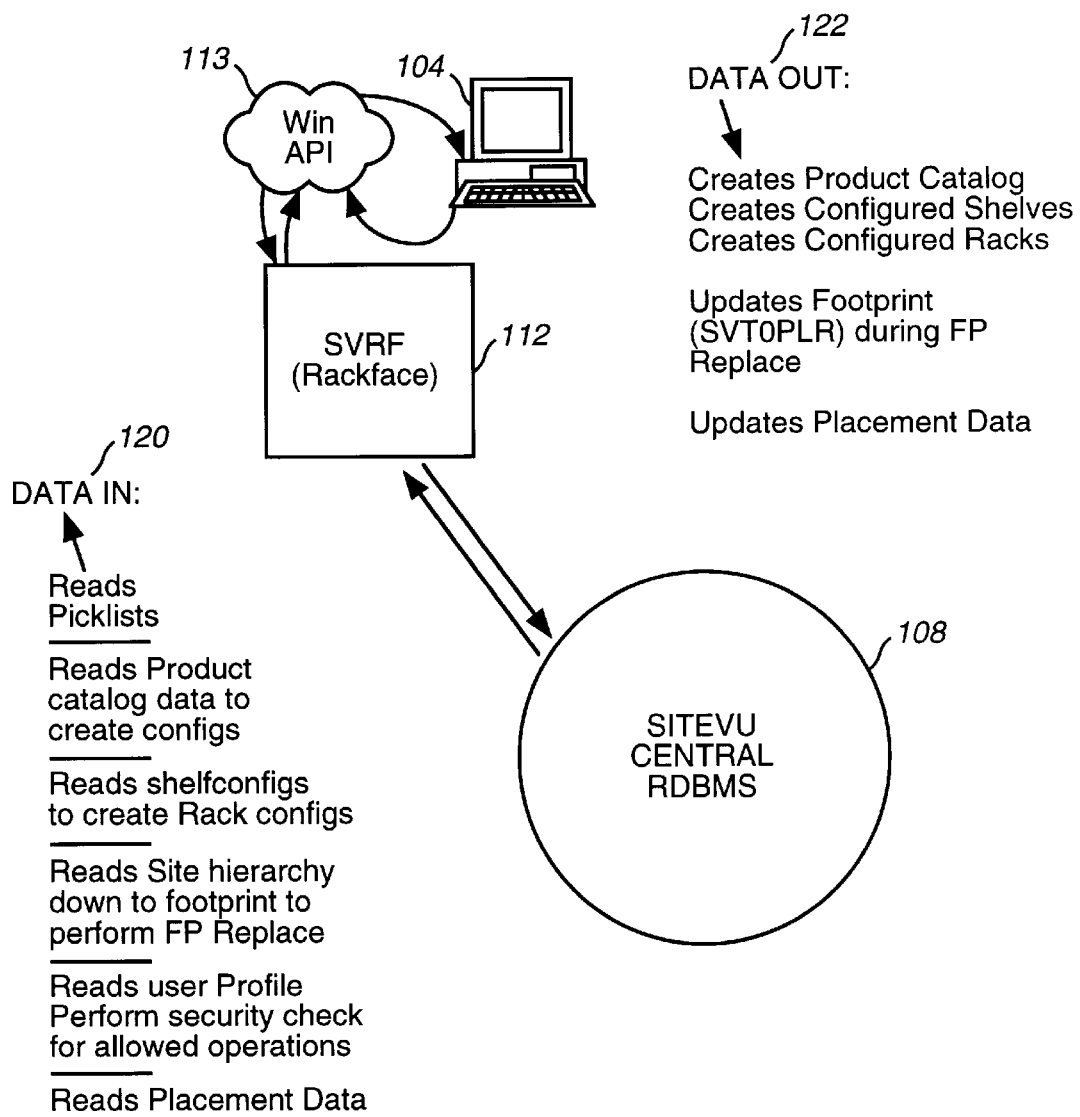
Figure 1E:
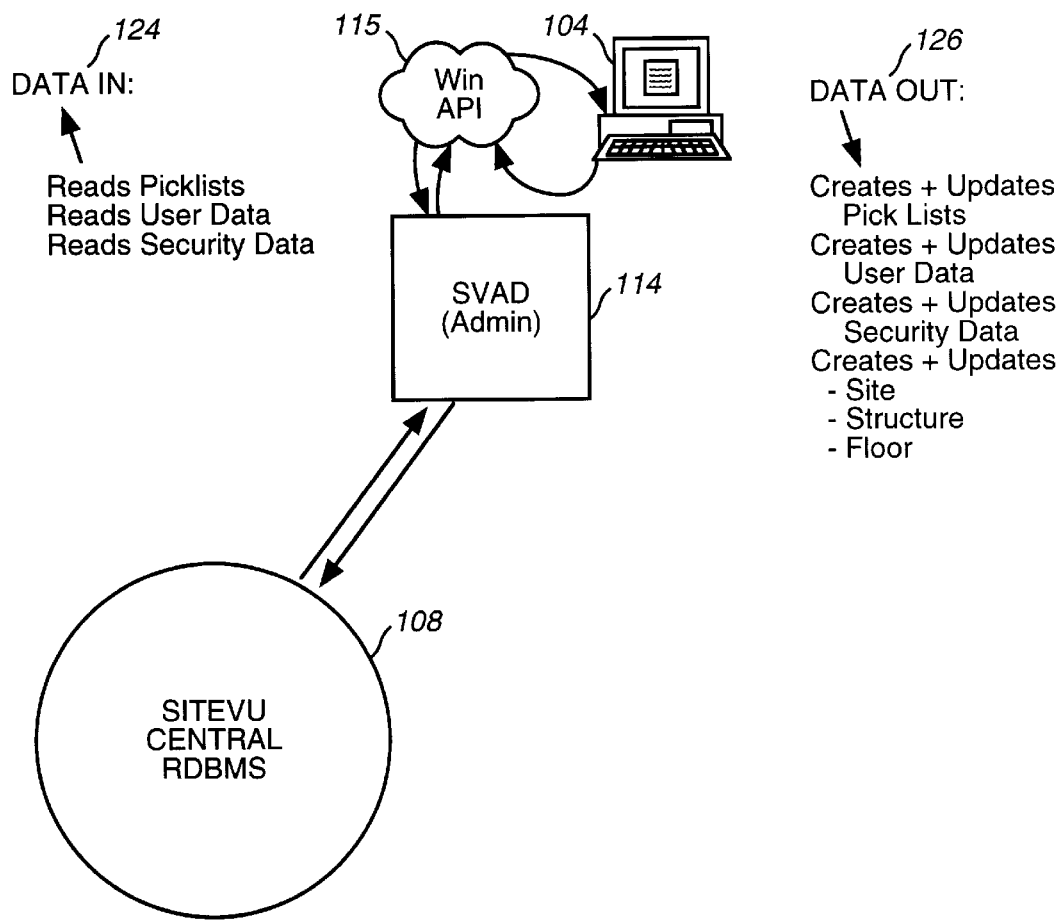
Figure 1F:
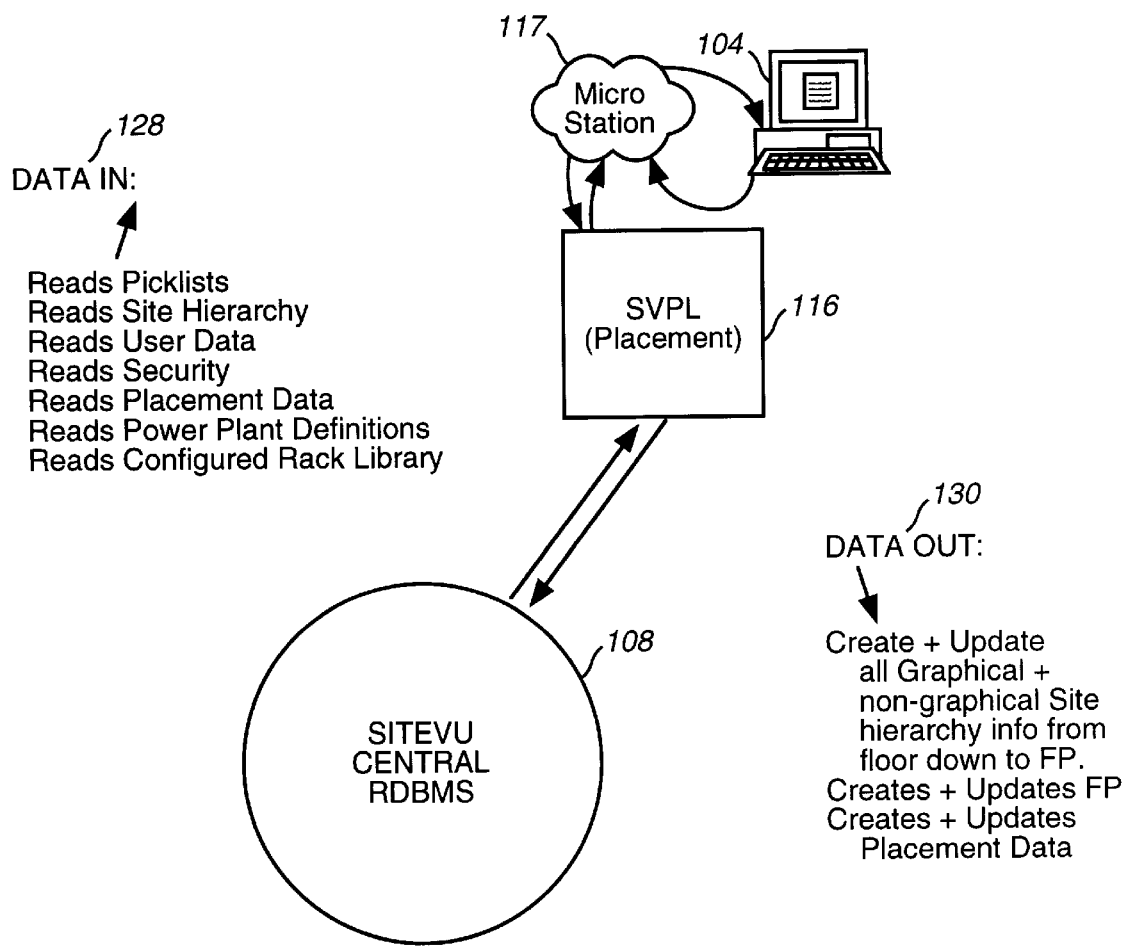
Figure 1G:
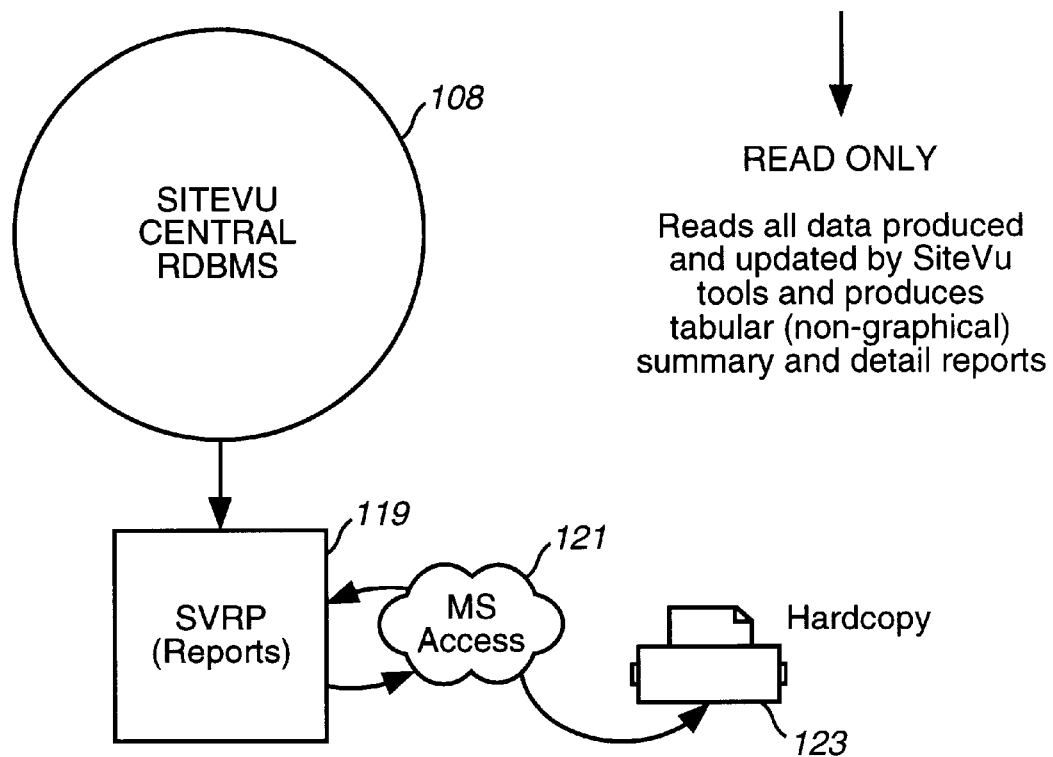
Figure 1H:
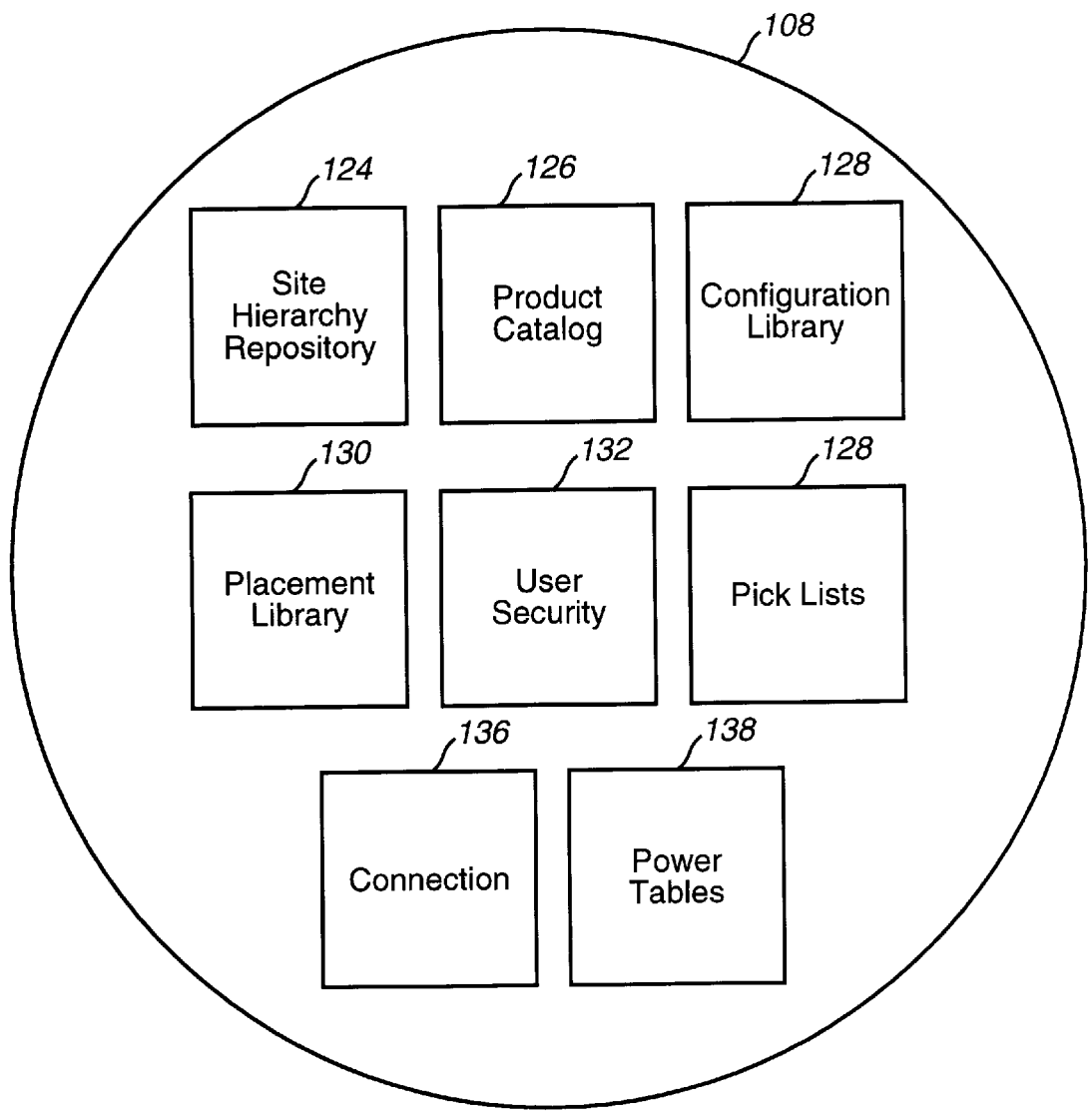
FIG. 1H is a block diagram depicting the components of a database according to a preferred embodiment of the present invention.

FIG. 1H depicts the logical components of the database 108, according to a preferred embodiment of the present invention. Specifically, in this example, the database 108 comprises: a site hierarchy repository 124; a product catalog 126; a configuration library 128; a placement library 130; user security 132; pick lists 134; connections 136; and power tables 138. A more detailed description of the database 108, illustrating specific tables and relationships between tables, is subsequently described below with reference to FIG. 10.

As indicated by FIG. 1B, the SiteVu central database 108 is preferably, a relational database management system. The SiteVu tool (FIG. 1B) comprises the following components: the SiteVu Power Pages (SVPP) 110; the SiteVu Rackface tool (SVRF) 112; the SiteVu Administrative tool (SVAD) 114; the SiteVu Placement tool (SVPL) 116, and the SiteVu Report Generator (SVRP) 119. The present invention is represented by the SiteVu Rackface tool (also referred to as rackface tool) 112, which is depicted in FIGS. 1B and 1D.

As indicated by FIG. 1B, the power page 110 reads data from and stores data in the database 108. The power page 110 provides power estimates for remote sites. In a system included in the preferred embodiment, a web browser 111 is used to input data into the power page 110 from the workstation 104, and to output data from the power page 110 to the workstation 104.

An implementation of a preferred embodiment of the present invention is referred to herein as the rackface tool 112. The rackface tool 112 reads data from and stores data in the database 108. Further, the rackface tool 112 defines components for the product catalog 126. In addition, the rackface tool 112 defines configured shelves using empty shelves and modules from the product catalog 126, and stores the configured shelves in the configuration library 128. In addition, the rackface tool 112 defines configured racks from rails and configured shelves from the product catalog 126 and the configuration library 128, respectively. Such configured racks (also referred to as racks), are stored in the configuration library.

In addition, the rackface tool 112 operates on footprints. As stated, footprints are racks that have been placed in remote sites, via the placement tool 116 (described below). Specifically, in a preferred embodiment, the rackface tool 112 is used to display information about footprints and to replace one footprint with another footprint, as described below.

In a preferred embodiment, the rackface tool 112 is implemented using Windows® operating system, provided by Microsoft, Inc. Thus, Window's® Application Programming Interface 113 is used to implement the functions provided by the rackface tool 112 on the workstation 104.

Similarly, the Administration tool 114 reads data from and stores data in the database 108. The Administration tool 114 is used to create and update the pick lists 134, user security data 132, and the site hierarchy repository 124. In a system included in the preferred embodiment, the Administration tool 114 is implemented using the Windows® operating system, provided by Microsoft, Inc. Thus, Window's®

Application Programming Interface 115 is used to implement the functions provided by the administration tool 114 on the workstation 104.

The placement tool 116 reads data from and stores data in the database 108. Specifically, the Placement tool 116 is used to create footprints by placing racks in remote sites. Such data is stored in the placement library 130. In a system included in the preferred embodiment, the placement tool 116 is implemented using a high level language provided by a the Mircrostation CADD program 117, as previously described.

The report generator 119 reads data from the database 108 to generate reports. In a system included in the preferred embodiment the report generator is implemented using Access 121, provided by Microsoft, Inc. Reports are printed on the printer 123.

FIG. 1C depicts the power page tool 110 in greater detail. The power page tool 110 receives power data, including power supply and site load data from a user at the workstation 104. As indicated by the data-in list 117, the power page tool 110 sends data to the database 108 for storage. Such data includes site data, battery plant data, rectifier data, battery data, generator data and inverter data. In an alternative embodiment, the power pages tool 110 is can be implemented as a stand-alone system including a database (not shown) which is separate from the database 108.

In any case, users at the workstations 104 can interface with the power page tool 110, via a web browser program 111. Examples of web browser programs include Internet Explorer by Microsoft Corporation and Netscape Navigator by Netscape Incorporated. From the workstations 104, users can add, delete or edit power data stored in database 108. Users may also instruct the power pages tool 110 to calculate the adequacy of power supplies for a particular site load. Preferably, the power pages tool 110 can calculate a reserve time for which a particular battery plant can sustain a specified site load. In addition, the power pages tool 110 preferably determines whether additional rectifiers are required for a battery plant.

FIG. 1D depicts various types of data used by rackface tool 112, according to a preferred embodiment of the present invention. As indicated by the data-in list 120, the rackface tool 112 reads pick lists 134 from the database 108. As described in further detail below, a pick list is a database table that comprises a list of valid values for particular data fields within the database 108. Preferably, pick list tables are used during a data entry process to provide users with a drop-down list box, or the like, comprising textual representations of pre-defined values that can be specified for particular data fields. Note that the term "pick list" is used herein to describe a pick list table in the database 108. However, the term is also used herein to describe the drop-down list box that is associated with a pick list table and used during a data entry process, as described above.

In addition, the rackface tool 112 reads data from the product catalog 126 to create shelf configurations that are stored in the configuration library 128. Further, configured shelf data from the configuration library 128 is used to create rack configurations that are also stored in the configuration library 128. Site hierarchy data is read from the site hierarchy repository 124, and is used to replace generic footprints with manufacturer specific footprints. Further, placement data is read from the placement library and used to display footprint information, and replace generic and manufacturer specific footprints, as described below.

User and security data 132 is read by the rack face tool to determine access rights and the like for particular users. In addition, placement data is read from the placement library 130 when the rackface tool 112 replaces generic footprints, as described below.

Examples of data output from the rackface tool 112, as indicated by the data-out list 122, includes product catalog data, configured shelves data and configured rack data. For example, the rackface tool 112 is used to create components for the product catalog 126. An example of a process that can be used to create components in the product catalog 126 is subsequently described herein with reference to FIG. 6.

Similarly, the rackface tool 112 is used to create entries in the configuration library 128. An example of a process that can be used to create data entries for the configuration library 128 is subsequently described herein with reference to FIGS. 4A, 4B and 6.

Another example of data output from the rackface tool 112, includes data used to update the placement library 130. For example, the placement library 130 is updated when a generic footprint is replaced with a manufacturer specific footprint, as described below.

FIG. 1E depicts various types of data used by administrative tool 114, according to a preferred embodiment of the present invention. As indicated by the data-in list 120, the administrative tool 114 reads pick lists 114 and user security data 132 from the database 108.

As indicated by the data-out list 126, the administrative tool 114 creates and updates pick lists 134 and user security data 132. In addition, this tool is used to create part of the site hierarchy that is stored in the site hierarchy repository 124, as described below. Specifically, the sites, buildings (or structures) and the non-graphical portion of the floor level hierarchies are created by the administrative tool 114.

Figure 2:
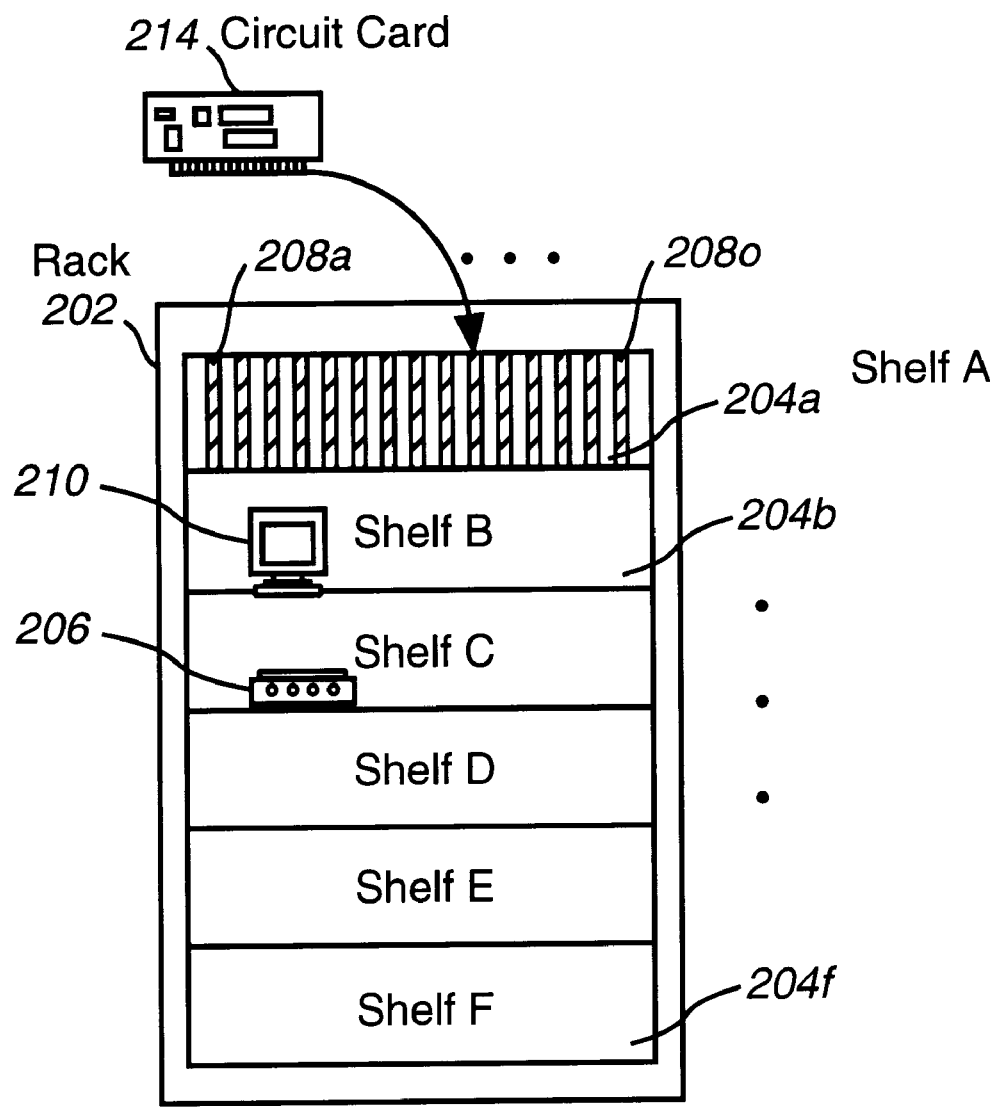
FIG. 2 is a block diagram depicting a rack, shelves and modules according to a preferred embodiment of the present invention.

As stated, equipment within remote sites are typically arranged and mounted in equipment racks. FIG. 2 is an illustration depicting a typical equipment rack 202. Accordingly, the equipment rack 202 comprises a plurality of shelves 204a–204f (generally 204). In this example, the shelf 204a comprises a plurality of vertically positioned slots 208a–208o (generally 208). Typically circuit cards, such as the circuit card 214, are installed in the slots 208.

As described below with reference to FIGS. 4A and 4B, data related to particular modules that can be used to configure the shelves 208, according to a preferred embodiment of the present invention, are stored in the product catalog 126. Accordingly, the circuit card 214 is an example of a type of module that is preferably represented in the product catalog 126. Other examples of types of modules can be represented in the product catalog 126 are the workstation 210 and the modem 206. As shown in FIG. 2, such modules 206, 210 and 214 are used to configure shelves 208, according to a preferred embodiment of the present invention.

FIG. 1F depicts the various types of data used by placement tool 116, according to a preferred embodiment of the present invention. As indicated by the data-in list 128, the placement tool reads pick lists 134, user and security data 132, site hierarchy data 124, placement data 130, configured rack data 128, and power plant definition data 138 from the database 108.

As indicated by the data-out list 130, the placement tool 116 stores data in the site hierarchy repository 124 from the floor level of the site hierarchy down to the row segment level. This data is stored in response to the function of creating site hierarchy levels as described below, with reference to FIG. 7.

FIG. 1G depicts the report generator 119 coupled between the database 108, the workstation 104 and a local or temporary relational database and report organizer 121. Users at workstation 104 are presented with a suite of pre-defined reports. Upon selection of a report, the report generator 119 generates an appropriate query to database 108. Query results are placed in local relational database and report organizer 121 where the data is rearranged into relational tables, as necessary.

The report generator 119 instructs the local relational database and report organizer 121 how to process the locally stored data and how to organize the results into a tabular format. Reports are then output to printer device 123 or the workstation 104. In a system included in the preferred embodiment, the report generator employs a report generator application such as, for example, Microsoft Access or Crystal Reports.

Figure 3:
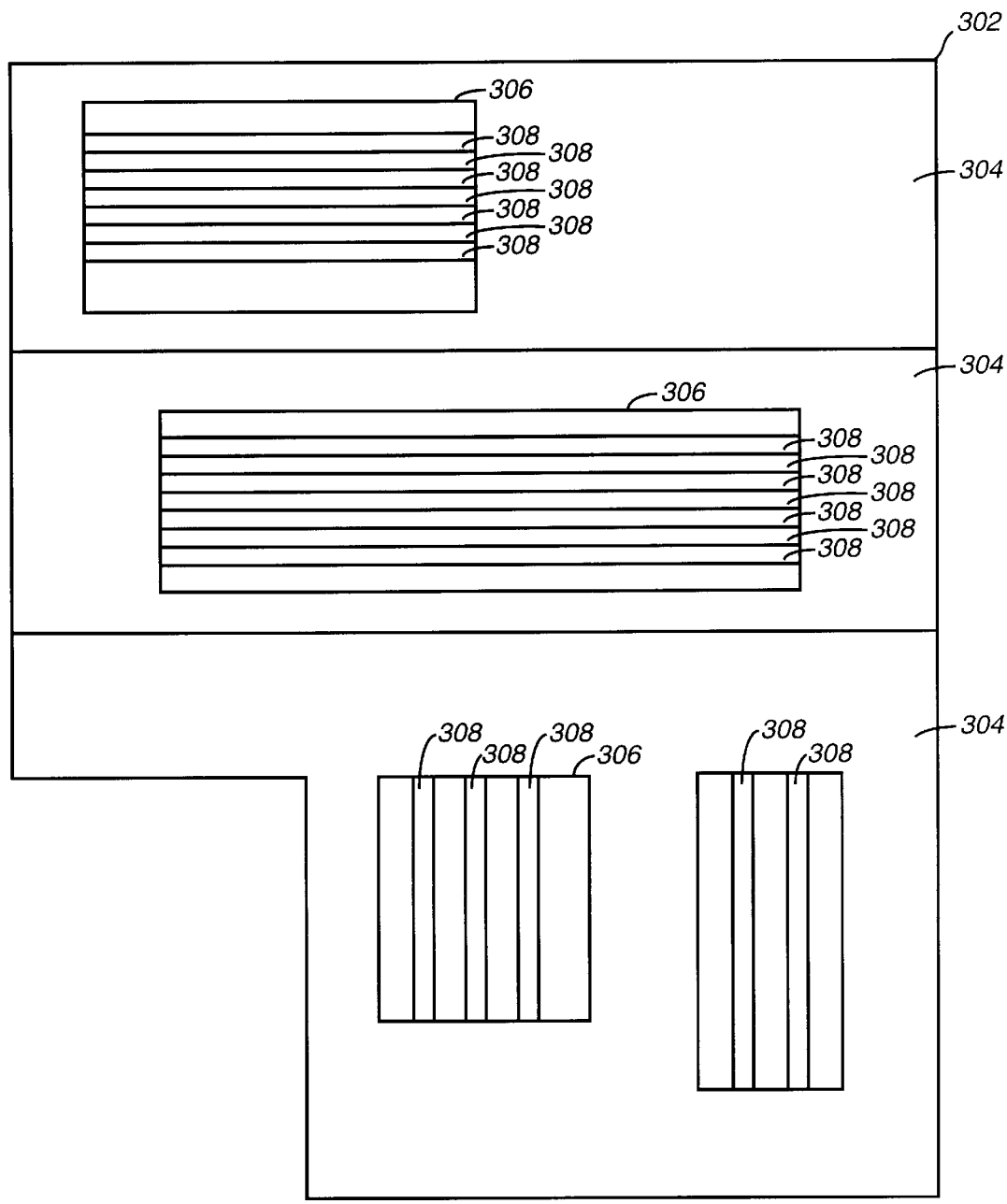
FIG. 3 is a block diagram depicting a graphical representation of the site hierarchy, according to a preferred embodiment of the present invention.

FIG. 3 is a block diagram that graphically illustrates an example of a site hierarchy, as previously described. Specifically, the site hierarchy shown in FIG. 3 comprises a floor 302, 3 zones 304, 4 planning units 306 and a plurality of row segments 308 within each planning unit 306. As previously described, each site hierarchy level shown in FIG. 3 is represented by a polygonal shape that completely encloses the lower site hierarchy level that are contained therein.

In this example of a system including a preferred embodiment, zones typically represent physical locations in which equipment of a particular class are placed. In a system included in the preferred embodiment, racks cannot be placed unless the equipment class of the rack matches the equipment class of the zone in which the rack is being placed. In one embodiment, this function is supported by the placement tool 112.

In this example, planning units 306 are specified so that multiple users can define row segments 308, in the same zone 304, at the same time. In a system included in the preferred embodiment, the database 108 is shared by multiple users. However, in order to maintain data integrity, certain precautions must be taken. In this example, when a user is in the process of defining rows and placing row segments 308, via the placement tool, as described below, other users are prevented from accessing certain portions of site hierarchy repository 124. In particular, when users are defining rows, the site hierarchy level just above the row level must be locked. Thus, a site hierarchy level of planning unit 306 is used between the row level 308 and zone level 304. Accordingly, planning unit 306 is locked from other users instead of the zone level 304. In this manner, several users can work simultaneously to define row segments 308 within the same zone 304.

Further, in this example, footprints can only be created in row segments 308. As will be described below, a physical row in a site may comprise one or more row segments 308. In the simple example shown in FIG. 3, there is a one to one correspondence between physical rows and row segment 308. However, a site hierarchy level called a row segment 308, is used in a system included in the preferred embodiment of the present invention, to prevent users from placing racks in areas that have physical obstructions. For example, suppose a physical obstruction, such as a building support column, is present within a particular row in a field site. In this case, the physical row is represented by two row segments, that are placed to avoid the obstruction. In this fashion, since racks can only be placed within row segments 308, a user cannot inadvertently place a rack in the same position as the obstruction.

As noted above, an implementation of the present invention provides a means for defining components, including modules, shelves and racks, that are stored in the product catalog 126. Preferably, detailed information pertaining to each component within the product catalog 126 is defined during a data entry process.

Figure 6:
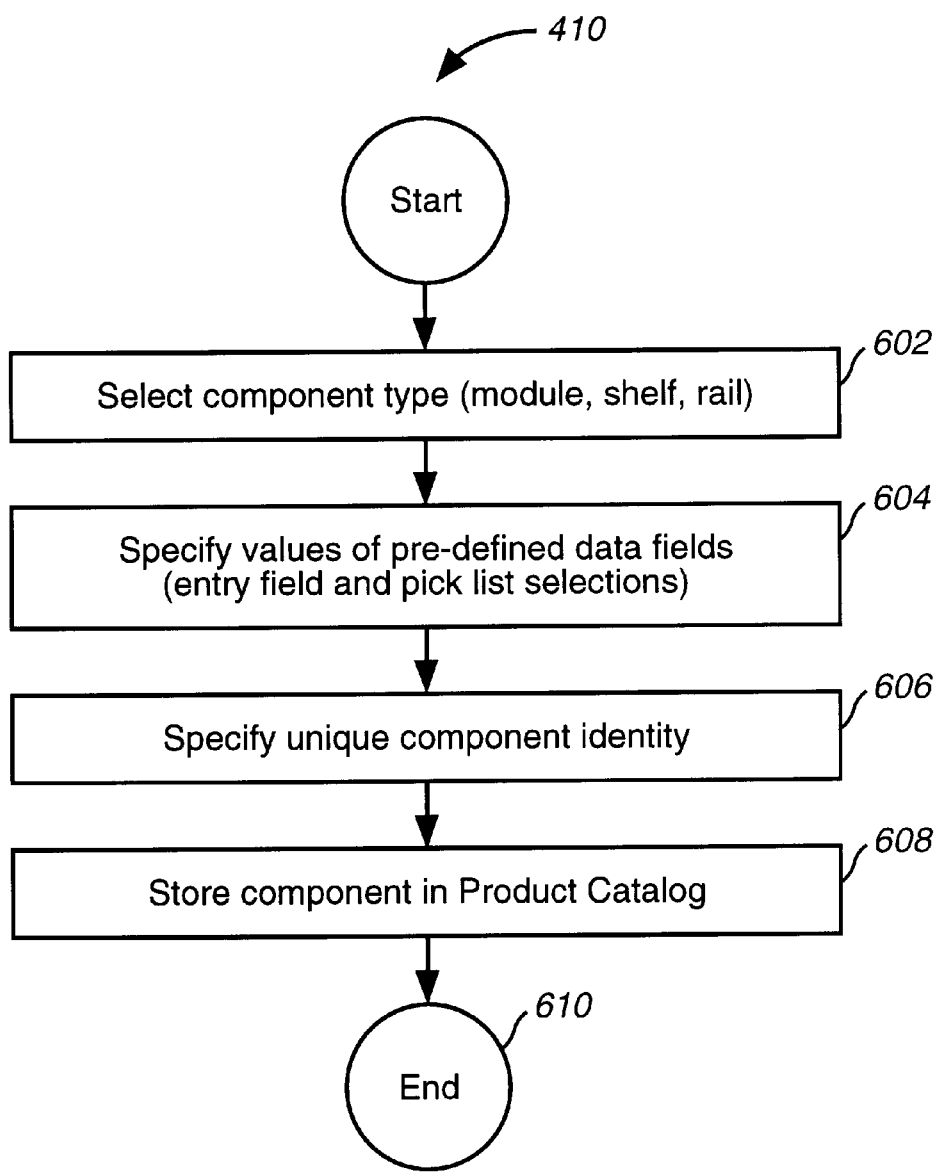
FIG. 6 is a flowchart depicting a process that can be used for creating a components in the product catalog, according to a preferred embodiment of the present invention.

FIG. 6 is a flowchart depicting an example of a data entry process that can be used to create components for the product catalog 126, according to a preferred embodiment of the present invention. Specifically, in a preferred embodiment, this process is performed by an implementation of the present invention referred to herein as the rackface tool 112. The process begins with step 602. In step 602, a user selects the component type. In this example, component types include modules, shelves and racks. Once a component type is selected, control passes to step 604. In step 604, the user specifies values for each attribute presented from a pre-defined list of attributes, that are applicable to the selected component type. Preferably, a different pre-defined list of attributes is presented for each component type. Thus, a particular list of attributes is presented to the user, depending on the type of component selected in step 602. Generally, values for attributes are specified by either typing data directly into data entry fields, or by selecting one or more pre-defined items from a pick list associated with the data attribute.

Examples of attributes that can be specified in step 604 include identifying attributes, physical attributes, electrical and connection attributes and status attributes. Identifying attributes include for example, manufacturer's name, manufacturer's model number, service provider's identifier, bar code identifier, manufacturer's part number, manufacturer's description, face label, equipment class code and equipment subclass code.

Note that the bar code identifier attribute can be used as a link between an embodiment of the present invention and an equipment tracking and registration system. An example of such a system can be found in the above referenced U.S. patent application entitled "System and Method for Registering and Maintaining Field Equipment Inventory Based on Individualized Equipment and Location Information".

Physical attributes generally include height, width, depth, and weight. Typical electrical attributes include voltage type, a voltage quantity, current and current quantity. Further, in a preferred embodiment, additional data fields are included that indicate whether or not the attributes have been completely specified.

In step 606, the user specifies a unique identifier for the newly created component. Next, as step 608 indicates the component is stored in the product catalog 126. The process ends with step 610.

Figure 4A:
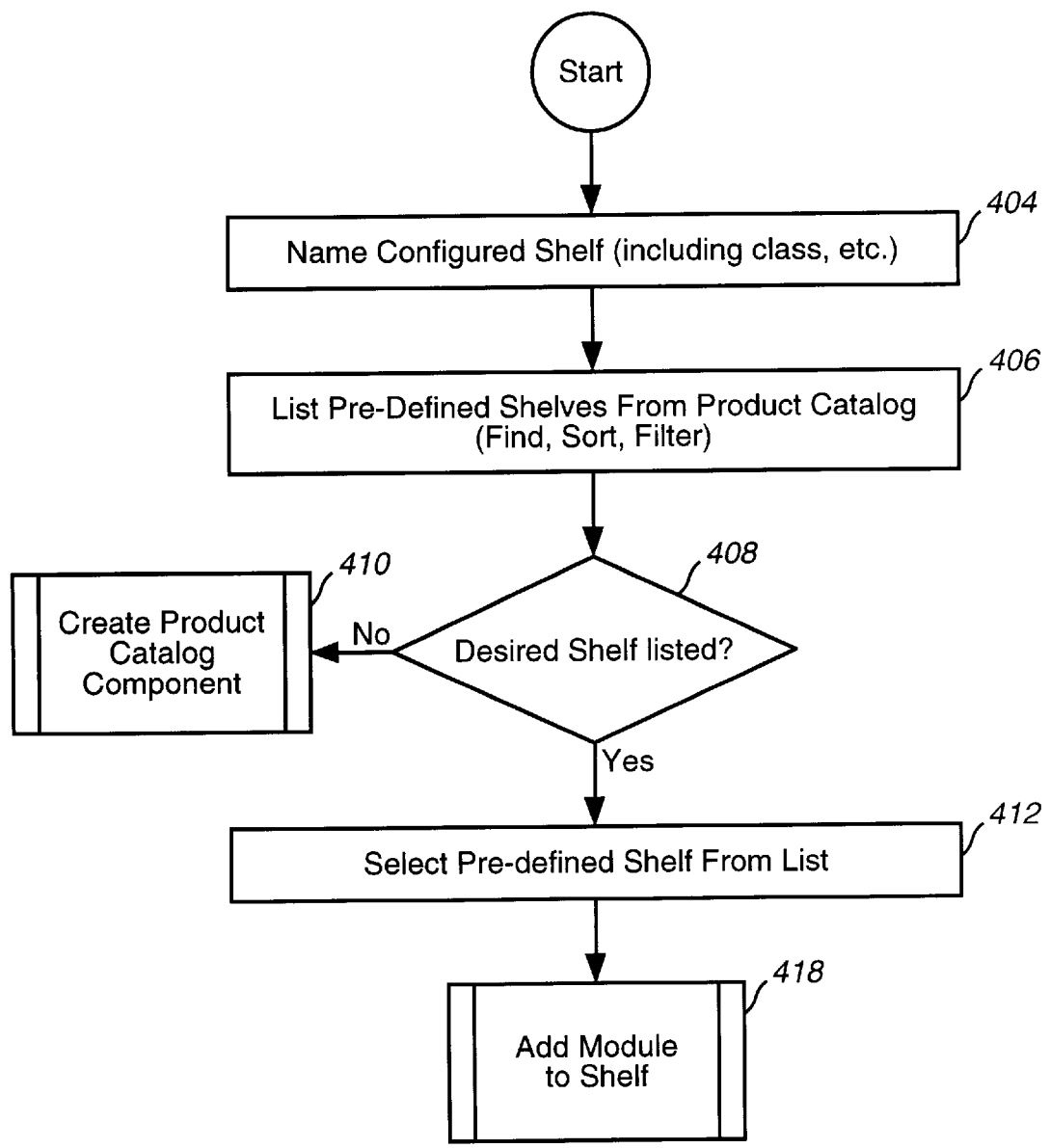
FIGS. 4A and 4B is a flowchart depicting a process that can be used for creating a configured shelf, according to a preferred embodiment of the present invention.

FIG. 4A is a flowchart depicting a process that can be used to create a shelf configuration, according to a preferred embodiment of the present invention. Specifically, this process is performed by an implementation of the present invention referred to as the rackface tool 122. The process begins with step 404. In step 404, the user specifies a unique name for the new shelf configuration. Typically, this name must be unique in the database 108. In addition, values are specified for required fields. For example, in a preferred embodiment, required fields include a manufacture, an equipment class and an equipment subclass. Note that in a preferred embodiment, a value for manufacturer or 'generic' is used for generic racks as previously described.

Next, in step 406, a pick list is displayed to the user comprising a list of pre-defined components from the product catalog 126. Thus, components that have been created according to the process depicted in FIG. 6 are listed in step 406.

Specifically, in this example, a list of shelf components are presented to the user. In a preferred embodiment, sort, find and filter options are provided to assist the user in finding a particular component listed in the product catalog 126. In any case, the user is prompted to select a particular shelf from the pick list presented in step 406.

Next, as step 408 indicates, if a desired shelf cannot be found in the product catalog 126, control passes to step 410. This can occur for example, if a user desires to use a particular shelf that has not yet been created, via the data entry process depicted in FIG. 6. Accordingly, the user has the option to create a new product catalog 126 component as indicated by step 410. Process steps that can be used to create a product catalog component 410 is presented in FIG. 6, as previously described.

On the other hand, as indicated by step 408, if the pick list in step 406 contains the desired shelf component, the user selects the shelf component in step 412. Control then passes to step 418. In step 418, the user adds modules to the selected shelf A process that can be used to add modules to a selected shelf is presented in FIG. 4B. This process is performed by the rackface tool 122, according to a preferred embodiment of the present invention.

Figure 4B:
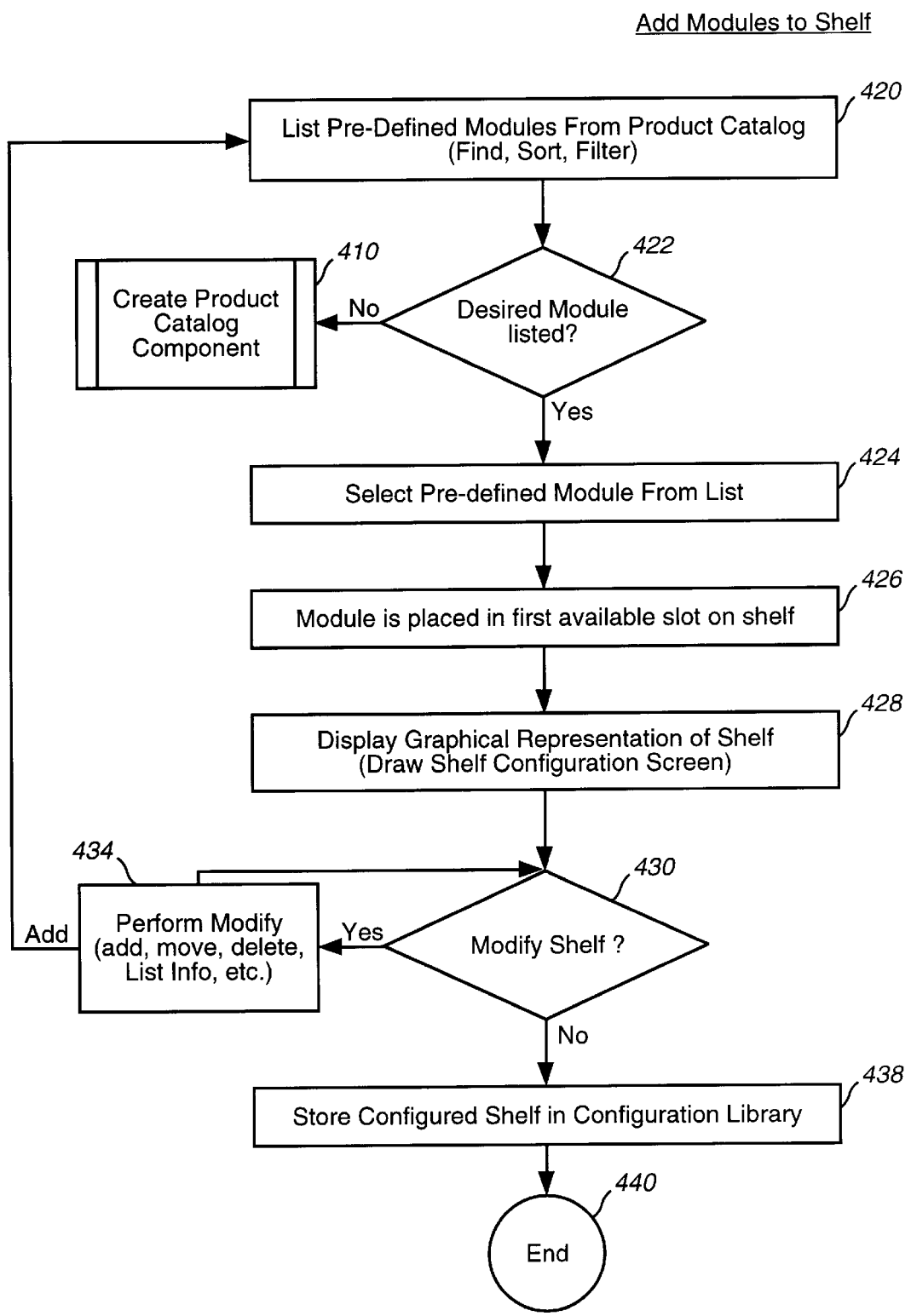

Referring to FIG. 4B, the process begins with step 420. In step 420 the user is presented with pick list that contains a list of pre-defined modules from the product catalog 126. In a preferred embodiment, sort, find and filter options are provided to assist the user in finding a particular module from product catalog 126.

Examples of pre-defined module types include circuit cards 214, computer terminals 210, and other equipment, such as the modem 206. Modules are components that are generally installed on shelves, such as the shelf 208. As step 422 indicates, if the desired module is included in the list presented in step 420 control passes to step 424, where the user selects the module. If not, once again the user has the option to create a product catalog component, as indicated by step 410.

After a module has been selected in step 424, control passes to step 426. In step 426, the selected module is placed in the first available slot 208 on the configured shelf 204. Next as step 428 indicates the user is presented with a graphical representation of the shelf and the module as selected from steps 412 and 424, respectively. Control then passes to step 430.

In step 430, the user has the option to modify the shelf. As step 434 indicates, this includes for example, adding, moving and deleting modules. In addition, the user can list information about the configured shelf. As indicated by step 434, if the user chooses to add more modules to the shelf, control passes to step 420, and steps 420–430 are repeated, as described above. In a preferred embodiment, users edit a configured shelf in step 434, by directly manipulating graphical representations of the selected modules, from step 428. For example, in one implementation, users "drag" graphical representations of the selected modules to particular locations within the graphical representation of the selected shelf. Preferably, a mouse or other pointing device is used to accomplish this task.

After the user has completed modifying the shelf, control passes to step 438. In step 438, the configured shelf is stored in the configuration library 128 and the process ends as indicated by step 440. In a preferred embodiment, the user also has the option to store the shelf as a "work-in-progress" to be completed later. In addition, other status such as "pending approval", "standard" or "special" can be specified. Preferably, only configured shelves with a status of approved standard (i.e. standard configured shelves that have been approved), or special can be used in a configured rack.

After one or more shelves have been configured and stored in the configuration library 128, according to the process in FIG. 4A and 4B, the configured shelves can be used to create configured racks.

Figure 5:
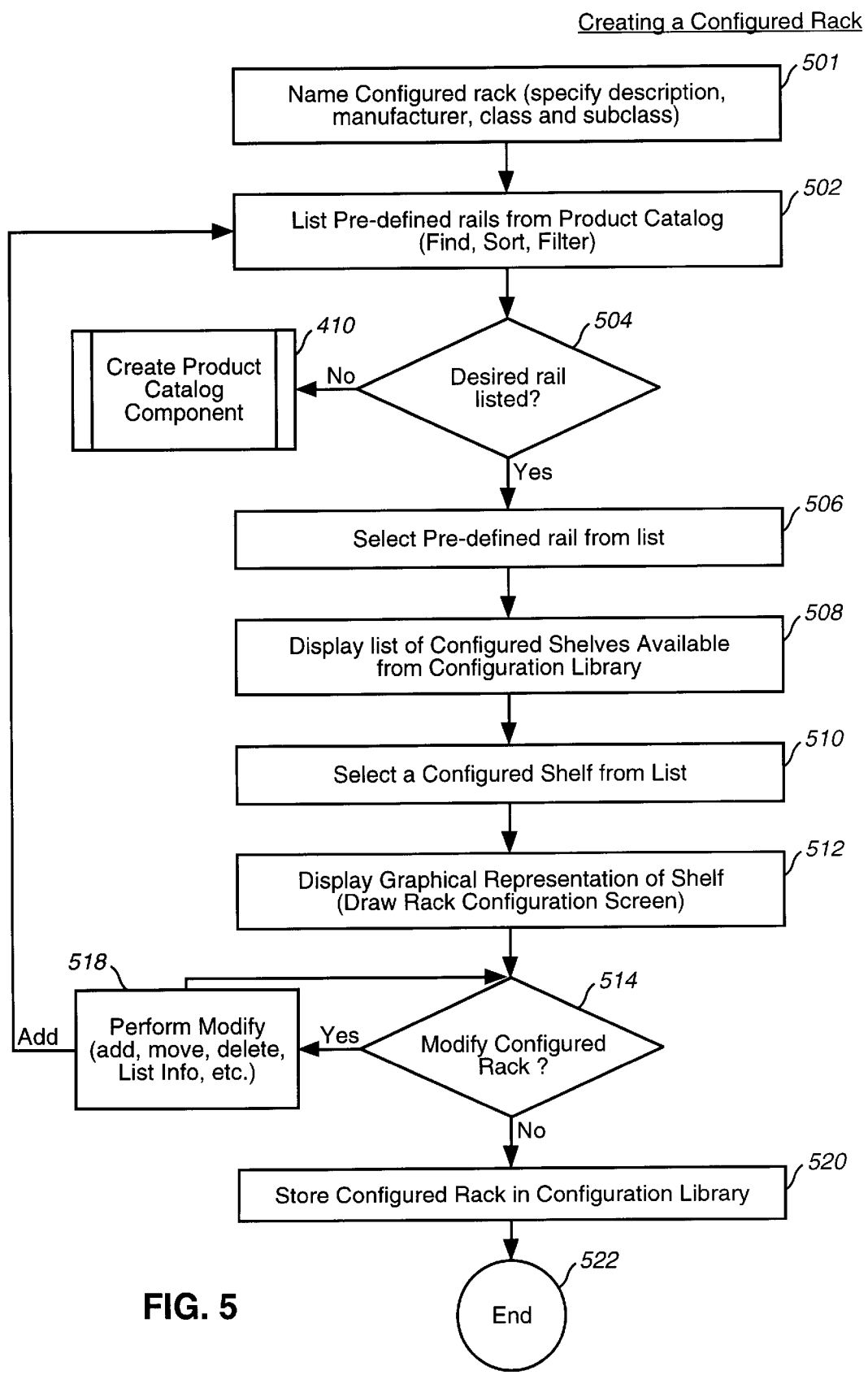
FIG. 5 is a flowchart depicting a process that can be used for creating a configured rack, according to a preferred embodiment of the present invention.

FIG. 5 is a flowchart illustrating a process which can be used to create a configured rack, according to a preferred embodiment of the present invention. The process begins with step 501. In step 501, the user specifies a name for the configured rack. In addition, required fields such as a description, a manufacture, a class and a subclass are preferably specified in step 501. In step 502, a list of pre-defined rails from the product catalog 126 is presented to the user. In a preferred embodiment, sort, find and filter options are provided to assist the user in finding a particular rail from product catalog 126. In any case, the user is prompted to select a rail from the pick list presented in step 502.

As step 504 indicates, if the desired rail is included in the list presented in step 504, control passes to step 506, where the user selects the rail. If not, once again the user has the option to create a rail for the product catalog 126 as indicated by step 410.

If a rail is selected in step 506, control passes to step 508. In step 508, the user is presented with a list of the available configured shelves from the configuration library 128. In a preferred embodiment, only shelves that are compatible with the selected rail are presented. Further, as previously noted, in a preferred embodiment, only configured shelves having a status of approved standard or special will be presented in the list in step 508. Note that the configured shelves presented in the pick list in step 508 are shelves that have been configured according to the process depicted by the flowchart in FIGS. 4A and 4B, as previously described. In step 510, the user selects a configured shelf from the pick list presented in step 508.

In step 512, a graphical representation of the selected shelf and rail are presented to the user. This graphical representation is presented to the user so that the user can directly manipulate it to modify the configured rack as described below with reference to step 518. In step 514, the user has the option to modify the rack. As step 518 indicates, this includes for example, adding, moving and deleting shelves. In addition, the user can list information about the configured rack. As indicated by step 518, if the user wishes to add additional shelves to the rack, control passes to step 508, and steps 508–514 are repeated, as described above.

As stated above, in a preferred embodiment, users modify a configured rack in step 518, by directly manipulating the graphical representations of the selected shelves from step 512. For example, in one implementation, users "drag" graphical representations of the selected shelves to particular locations within the graphical representation of the selected rail.

After creating a configured rack, for example, by using the process depicted by the flowchart in FIG. 5, they can be placed within a site. An example of a process that can be used to create footprints (i.e. placing a rack within a site), is subsequently described below with reference to FIG. 8. However, preferably, before footprints can be created, a site hierarchy for a particular site must be defined.

Figure 7:
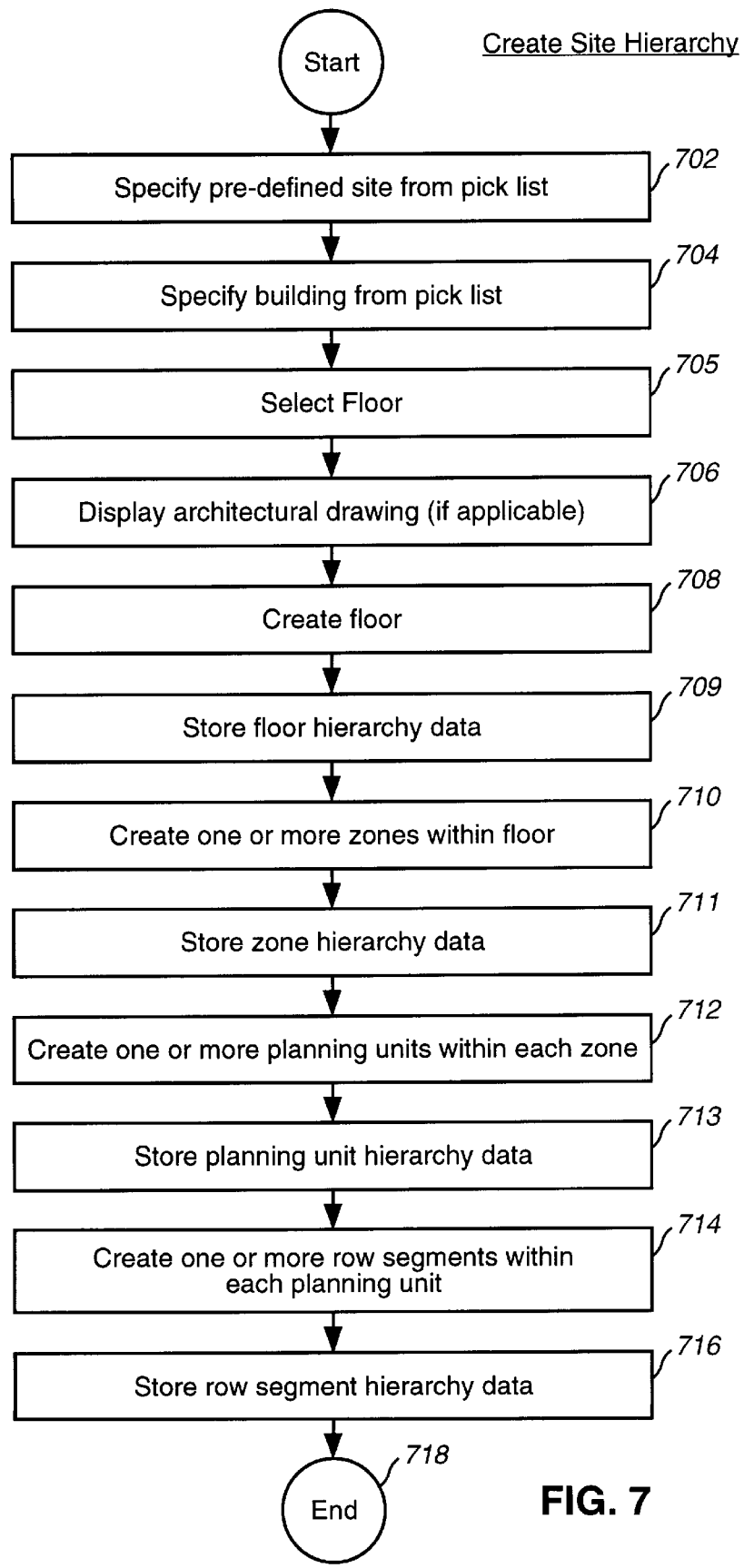
FIG. 7 is a flowchart depicting a process that can be used for creating a site hierarchy, according to a preferred embodiment of the present invention.

FIG. 7 is a flowchart illustrating a process that can be used to define the graphical portions of a site hierarchy, according to a system included in the preferred embodiment of the present invention. This process is performed by the placement tool 116. The process begins with step 702. In step 702, a user specifies a pre-defined site. This is preferably accomplished by selecting a site from a pick list of sites that have been defined via the administrative tool 114. The data related to the site is stored by the administrative tool 114 in the site hierarchy repository 124. After a site is selected in step 702, control passes to step 704.

In step 704, the user specifies a particular building. Again, this is preferably accomplished by having the user select a particular building that corresponds with the particular site selected from step 702, according to the site hierarchy repository 124. After a building is selected in step 704, control passes to step 705. In step 705, the user selects a particular floor corresponding to the building selected in step 704. Control then passes to step 706.

In a system included in the preferred embodiment, as indicated by step 706, the user is presented with a graphical display of an architectural drawing of the floor that is selected in step 705. In this example, architectural drawings are used as a guide to assist users with the creation of the site hierarchy as described below.

Preferably, a CADD program, such as Microstation's CADD is used to display the architectural drawing of the floor plan, and the graphical representations of the site hierarchy. For example, in a system included in the preferred embodiment, after the user selects a particular floor, SiteVu reads the name of the architectural drawing from the database 108. SiteVu then directs the CADD program to display the architectural drawing corresponding with the name fetched from the database 108.

Note, that the use of architectural drawings as a guide and backdrop is optional. Users can define the floor, zones, planning units, and rows and row segments, as described below with reference to steps 708–716, without the use of an architectural drawing. However, the architectural drawing is useful not only because it provides additional details about the floor-plan (i.e. location of power and transmission cables, obstructions, stairwells, etc.), but because it can be used to 'trace' the floor hierarchy level, as described below.

In any event, whether or not an architectural drawing is used, a preferred embodiment of the present invention interfaces with a CADD program for the rendering of graphical data representing the site hierarchy. For example, many CADD programs provide a published interface that can be used for this very purpose. For example, Microstation CADD provides program developers with a high level host language called Microstation Development Language (MDL). In a system included in the preferred embodiment, an implementation of the present invention uses MDL to direct the CADD program to perform CADD functions, such as rendering graphical representations of the site hierarchy on the display screen. The use of such a host language to direct a CADD program to perform CADD functions is well known and would be apparent to those skilled in the relevant art(s).

Accordingly, as step 708 indicates, the user creates a floor hierarchy level of the site hierarchy. Preferably, this is accomplished with the assistance of graphical tools that allow the user to specify the shape and size of the desired floor hierarchy level. In a system included in the preferred embodiment, such graphical tools are provided by an implementation of the present invention. As stated, in a system included in the preferred embodiment, the graphical tools provided by the present invention interface with the CADD program in order to render the results on the display screen.

If an architectural drawing is used as a backdrop, the user simply uses the graphical tools to trace the edge of the architectural floor-plan to thereby define a floor hierarchy level 302. If an architectural drawing is not displayed, the user then uses some other means (such as a hand drawn site planning map or the like) to define the floor hierarchy level, using the graphical tools provided by the present invention. Once a floor hierarchy level is defined, it is stored in step 709.

In step 710, the user creates one or more zones 304 within the floor hierarchy level defined in step 708. Again, in a system included in the preferred embodiment, the same graphical tools are used to define such zones, which are in turn, rendered by the CADD program. After each zone hierarchy level is defined, it is stored as step 711 indicates. In a similar fashion, as indicated by step 712, one or more planning units 306 are defined within each zone 304. After each planning unit hierarchy level is defined, it is stored as step 713 indicates. Next, as step 714 indicates, one or more row segments 308 are defined within each planning unit 306. After each row segment hierarchy level is defined, it is stored as step 716 indicates. As stated, the site hierarchy levels are stored in the site hierarchy repository in the database 108. The process ends with step 718.

In the preferred embodiment of the present invention, racks can only be placed within row segment hierarchy levels 308. Accordingly, once a site hierarchy is defined as described above with reference to FIG. 7, footprints can be created within the areas defined as a row segment hierarchy level 308.

Figure 8:
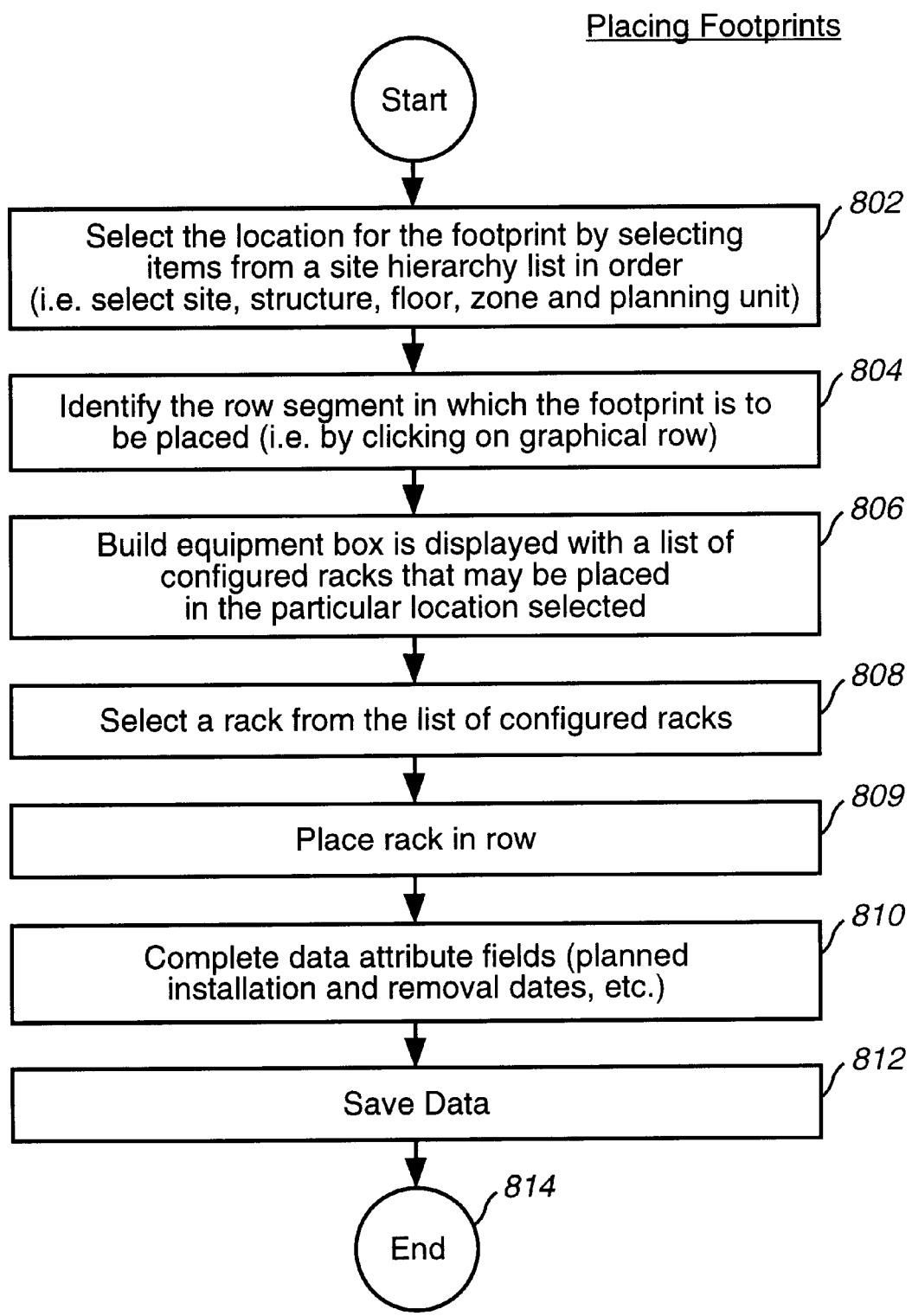
FIG. 8 is a flowchart depicting a process that can be used for creating a footprint, according to a preferred embodiment of the present invention.

FIG. 8 is a flowchart illustrating a process that can be used for creating footprints, according to a system included in the preferred embodiment of the present invention. This process is implemented with the placement tool 116. The process begins with step 802. In step 802 the user selects a location for the footprint by selecting items from a site hierarchy list. For example, a user first selects a site, followed by a building (or structure), followed by a floor 302, followed by a zone 304, and followed by a planning unit 306.

In step 804, the user selects a particular row segment in which the footprint is to be created. In a system included in the preferred embodiment, the selection of the site, building and floor in step 802, is accomplished with the use of pick lists, as previously described. Once a floor is specified, a graphical representation of the site hierarchy levels is preferably presented to the user. Note, this may or may not include the architectural drawing, as described above.

Preferably, the user is provided with an option to display particular site hierarchy levels, or all site hierarchy levels that are defined for a particular floor. In a system included in the preferred embodiment, once the site hierarchy levels are graphically displayed, the user can directly zoom-in a particular portion of the graphical representation and select a particular row segment therein. Accordingly, the steps of selecting a zone and planning unit, as specified by step 802 are effectively bypassed using this method. However, many other methods can also be used without departing from the spirit and principle of the present invention.

In any case, once a particular row segment is identified, control passes to step 806. In step 806 a build equipment pick list presented to the user. This pick list comprises a list of configured racks 202, as described above with reference to FIG. 5. As noted above, in a system included in the preferred embodiment, only racks that have the same equipment class as the zone associated with the selected row segment from step 804, is presented in the pick list in step 806. In addition, as previously described, generic racks can also be displayed in the equipment pick list. In step 808 the user selects a rack from the list of configured racks presented in step 806.

Next, in step 809, the user places the selected rack from step 808 in a particular location within the row segment selected in step 804. Again, this is preferably accomplished by directly manipulating a graphical representation of the rack on top of the graphical representation of the selected row segment.

Once the rack is placed in step 809, control passes to step 810. In step 810 the user specifies particular values for attributes that are associated with footprints. For example, such attributes include a planned installation date and a planned removal date. Control then passes to step 812 where the footprint is saved in the database 108. The process ends with step 814.

Note that the use of planned installation and removal dates allow planners to view the placement and configuration of equipment in a time dependant manner. For example, the present invention can be used to see how the site will look five years into the future, for planning purposes and the like.

As stated, the rackface tool 112 is preferably used to operate on footprints. Specifically, in a preferred embodiment, the rackface tool 112 is used to display and update information about footprints, and to replace footprints generic and specific footprints, as described below.

As noted above, placing generic racks in field sites is useful for installing equipment in stages. For example, in a typical implementation of the present invention, facility planning groups generally reserve floor space for particular types of equipment by placing generic racks therein, as described above. The generic racks all have a particular equipment class and sub-class associated with them. In a subsequent process, such generic racks are typically replaced with manufacturer specific racks by engineering groups. In a preferred embodiment, an implementation of the present invention assures that the manufacturer specific racks are of the same equipment class and subclass as the generic racks they are replacing.

Figure 11:
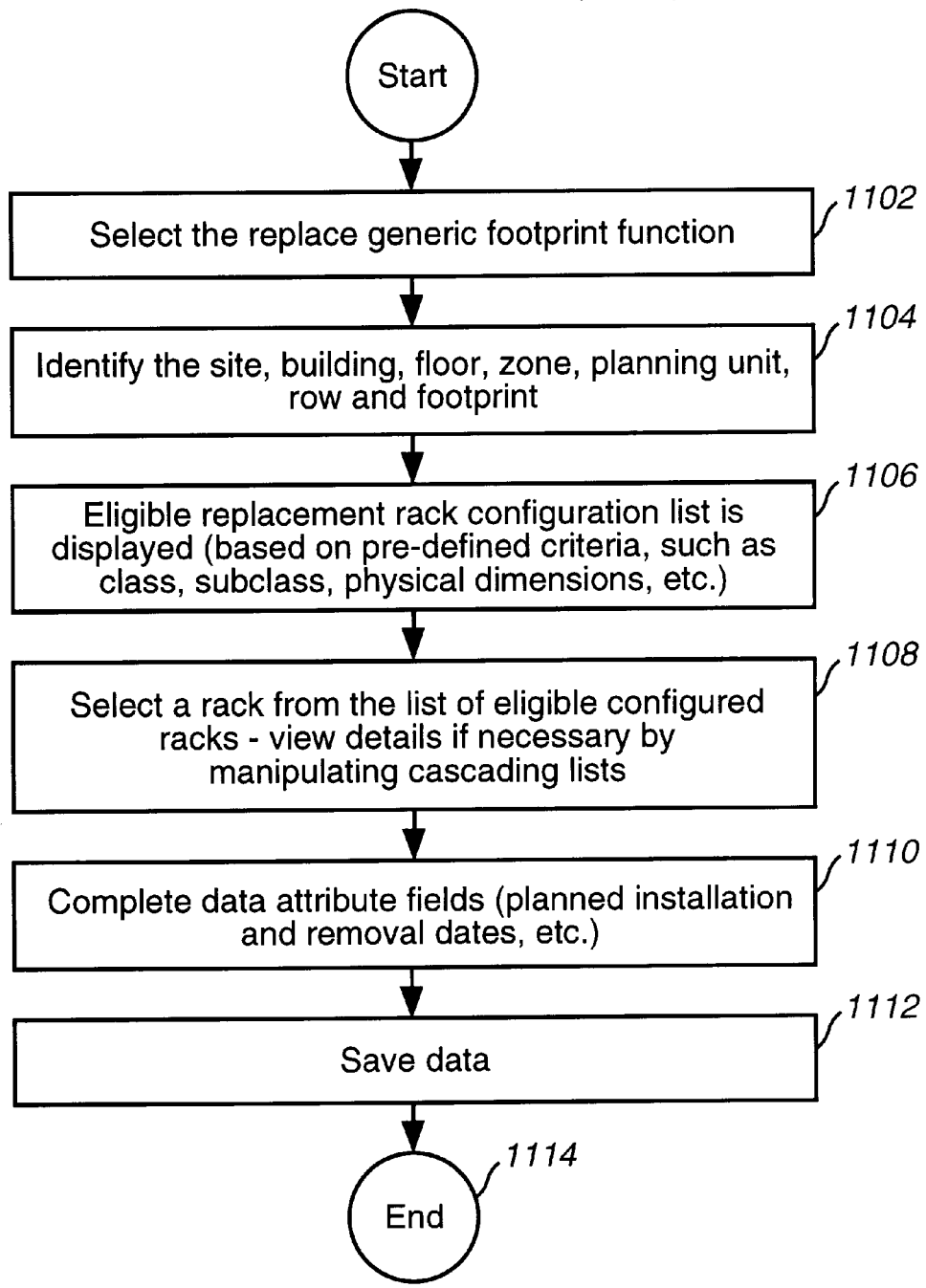
FIG. 11 is a flowchart depicting a process that can be used to replace generic footprints with manufacturer specific footprints, according to a preferred embodiment of the present invention.

A process that can be used to replace generic footprints with manufacturer specific footprints, according to a preferred embodiment of the present invention is depicted in FIG. 11. The process begins with step 1102. In step 1102, a user selects a function to replace a generic footprint. Next, in step 1004, the user selects a particular footprint to replace. This is typically accomplished by presenting a series of textual pick lists each representing a level of the site hierarchy according to the site hierarchy repository 124. Accordingly, the user selects a particular zone, planning unit, row and footprint. Next in step 1106, an eligible replacement rack configuration list is presented to the user.

The eligible replacement rack configuration list is preferably a list of configured racks from the configuration library 128, which is filtered based on pre-defined criteria. For example, in a preferred embodiment, only racks that are of the same class and sub-class as the generic rack being replaced are presented. Further, because of physical space constraints, only racks that are of the same or smaller dimensions as the generic rack are included in the list. Other criteria that may be appropriate for each specific implementation of the present invention is also used to filter the list presented in step 1106.

In step 1108, the user selects a rack from the list presented in step 1104. In a preferred embodiment, details of each eligible replacement rack list item is available to assist the user in selecting a particular replacement rack. For example, the user can view configuration information such as details pertaining to the configured shelves that comprise the configured rack. Further, details pertaining to the modules that are specified for each configured shelf can also be presented. Preferably such information is presented in the form of a expandable and collapsible cascading list. For example, a plus button is displayed next to each rack item in the list. Accordingly, in the event that a user wishes to view detailed information about a particular rack configuration, the plus button is selected.

These actions causes the next level of the rack configuration hierarchy to be displayed. For example, the list item representing the selected rack is expanded such that a new list comprising a list of configured shelves associated with the rack item is displayed. Similarly, for each configured shelf in the list, a plus button is displayed. Thus, when a user wishes to view detailed information about a particular shelf configuration, the plus button is again selected. This causes that list to be expanded such that a list of modules associated with the configured shelf is displayed. After a list is expanded, the plus button that was used to expand the list becomes a minus button. The minus button can be used to contract the expanded list.

Accordingly, once a user is satisfied with the replacement manufacturer specific rack, the rack is selected in step 1108. Control then passes to step 1110. In step 1110 the user specifies particular values for attributes are associated with the placement of footprints. Specifically, placement data attributes that are stored in the placement library 130 are specified in step 1110. Such attributes include planned and actual dates for installation, activation, decommission and removal of the placed components. Preferably, such dates can be specified for each of the components that comprise the footprint, including the rack itself, each shelf, and each module that comprises each shelf. In a preferred embodiment, expandable and collapsible cascaded lists are used to assist the user in completing such attributes, as described above.

As noted above, this level of detail allows for future planning of remote sites down to the card level. This unique feature of the present invention allows facility planners and other groups to accurately view detailed information about the placement and configuration of equipment in remote sites in a time dependent manner.

Next, in step 112, the footprint data is saved in the placement library 130. The process ends with step 1114.

Figure 12:
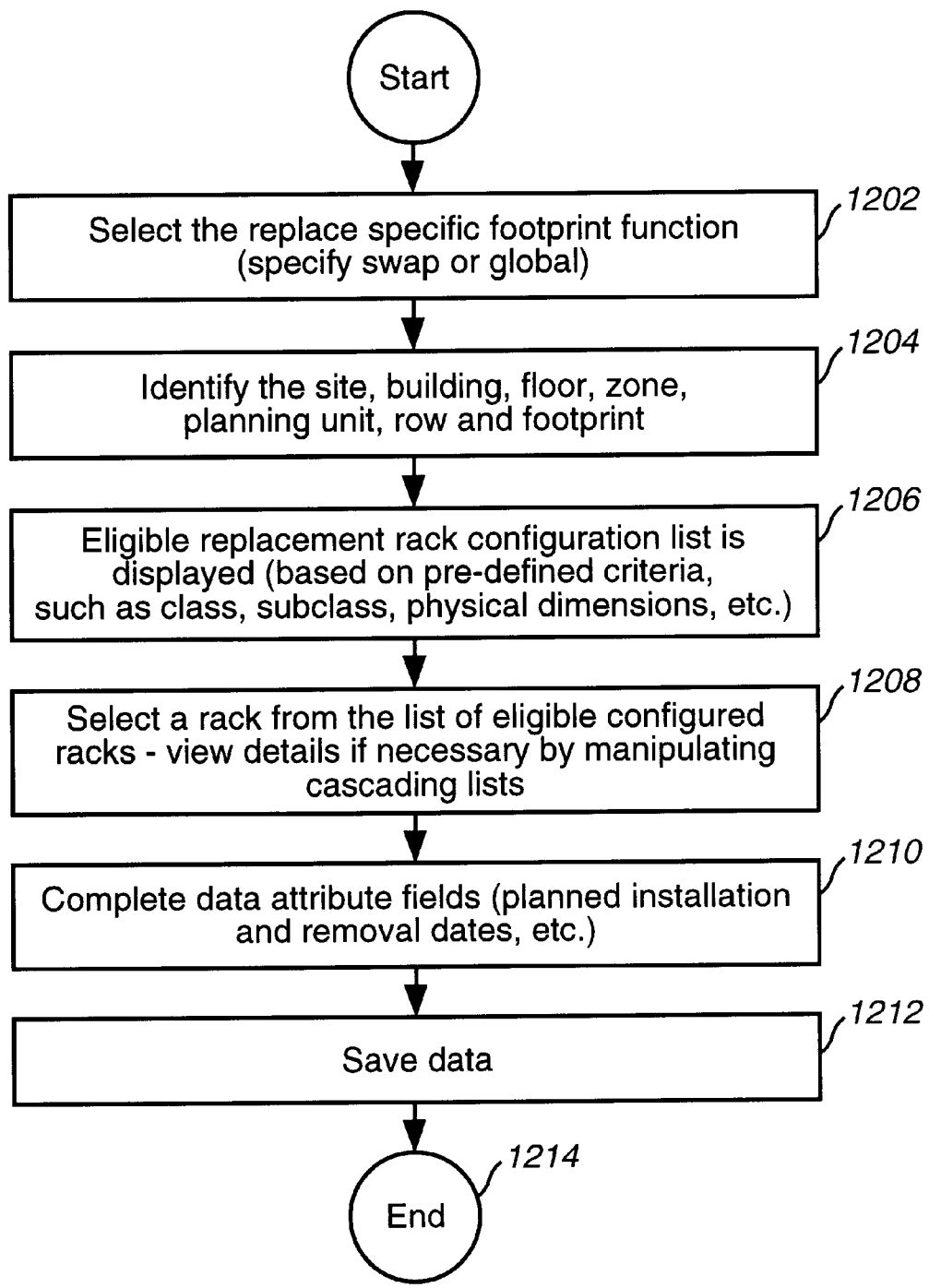
FIG. 12 is a flowchart depicting a process that can be used to replace specific footprints, according to a preferred embodiment of the present invention.

FIG. 12 is a flowchart depicting a process that can be used to replace specific footprints, according to a preferred embodiment of the present invention. Specifically, this process is used to replace one manufacturer specific footprint with another. Generally, this is used to correct errors having to do with the configuration of manufacturer specific configured racks that have been placed in remote sites.

It should be noted that if only the placement data (i.e. the planned and actual installation, activation, decommission and removal dates), of one or more particular footprints needs to be updated, the update footprint placement data process as depicted in FIG. 14 should be used. However, if such placement data needs to be updated on a global basis for all footprints associated with a particular configured rack, the process depicted in FIG. 12 is preferably used.

The process begins with step 1202. In step 1202, the user selects the function to replace a specific footprint. In addition, the user also specifies either a "global" or "swap"

replacement. If a global replacement is specified, the process replaces all footprints within the database 108, that have the same associated configured rack as the footprint that is being replaced.

If a swap replacement is specified, the process only replaces a single footprint as described below. After the user specifies either the global or swap option, control passes to step 1204. In step 1204, the user selects a particular footprint to replace. This is typically accomplished by presenting a series of textual pick lists each representing a level of the site hierarchy according to the site hierarchy repository 124. Accordingly, the user selects a particular zone, planning unit, row and footprint. Next in step 1206, an eligible replacement rack configuration list is presented to the user.

The eligible rack configuration list is preferably a list of configured racks from the configuration library 128 that is filtered based on pre-defined criteria. For example, in a preferred embodiment, only racks that are of the same class and sub-class as the rack being replaced are presented. Further, because of physical space constraints, only racks that are of the same or smaller dimensions as rack being replaced are included in the list. Other criteria that may be appropriate for each specific implementation of the present invention is also used to filter the list presented in step 1206.

In step 1208, the user selects a rack from the list presented in step 1204. In a preferred embodiment, details of each eligible replacement rack list item is available so that the user can select a specific replacement rack. For example, the user can view configuration information such as details pertaining to the configured shelves and modules that comprise the configured rack, as described above.

Accordingly, once a user is satisfied with the replacement manufacturer specific rack, the rack is selected in step 1208 and control passes to step 1210. In step 1210 the user specifies particular values for attributes associated with the placement footprints. Specifically, placement data attributes that are stored in the placement library 130 are specified in step 1210. Such attributes include planned and actual dates for installation, activation, decommission and removal of components. Preferably, such dates can be specified for each of the components that comprise the footprint, including the rack, each shelf, and each module that comprises each shelf. In a preferred embodiment, expandable and collapsible cascaded lists are used to assist the user, as described above.

Note that if global was specified in step 1202, the user has the option to apply the placement specific data to all of the footprints that are being replaced. Next, in step 1212, the footprint data is saved in the placement library 130, and the process ends as indicated by step 1214.

Figure 13:
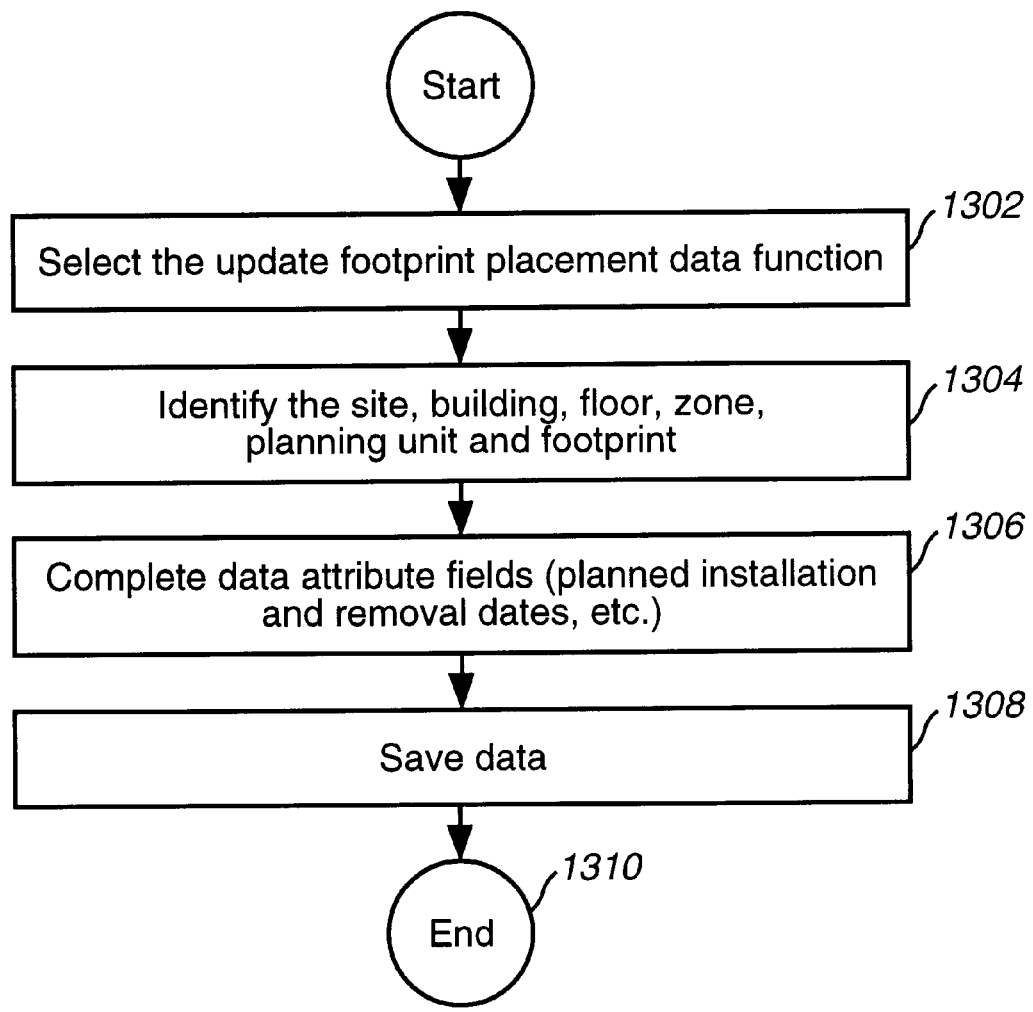
FIG. 13 is a flowchart depicting a process that can be used to update footprint placement data, according to a preferred embodiment of the present invention.

FIG. 13 is a flowchart depicting a process that can be used to update footprint placement data, according to a preferred embodiment of the present invention. Specifically, this process is used to update information in the placement library 130. Such information includes planned and actual installation, activation, decommission and removal dates for particular footprints.

The process begins with step 1302. In step 1302, the user selects the function to update footprint placement information. In step 1304, the user selects a particular footprint. This is typically accomplished by presenting a series of textual pick lists each representing a level of the site hierarchy according to the site hierarchy repository 124. Accordingly, the user selects a particular zone, planning unit, row and footprint. Next in step 1306, user updates values for placement data attributes. Such attributes include planned and actual dates for installation, activation, decommission and removal of components. Preferably, such dates can be specified for each of the components that comprise the footprint, including the rack, each shelf, and each module that comprises each shelf. In a preferred embodiment, expandable and collapsible cascaded lists are used to assist the user, as described above. Next, in step 1308, the footprint data is saved in the placement library 130, and the process ends as indicated by step 1310.

Figure 10A:
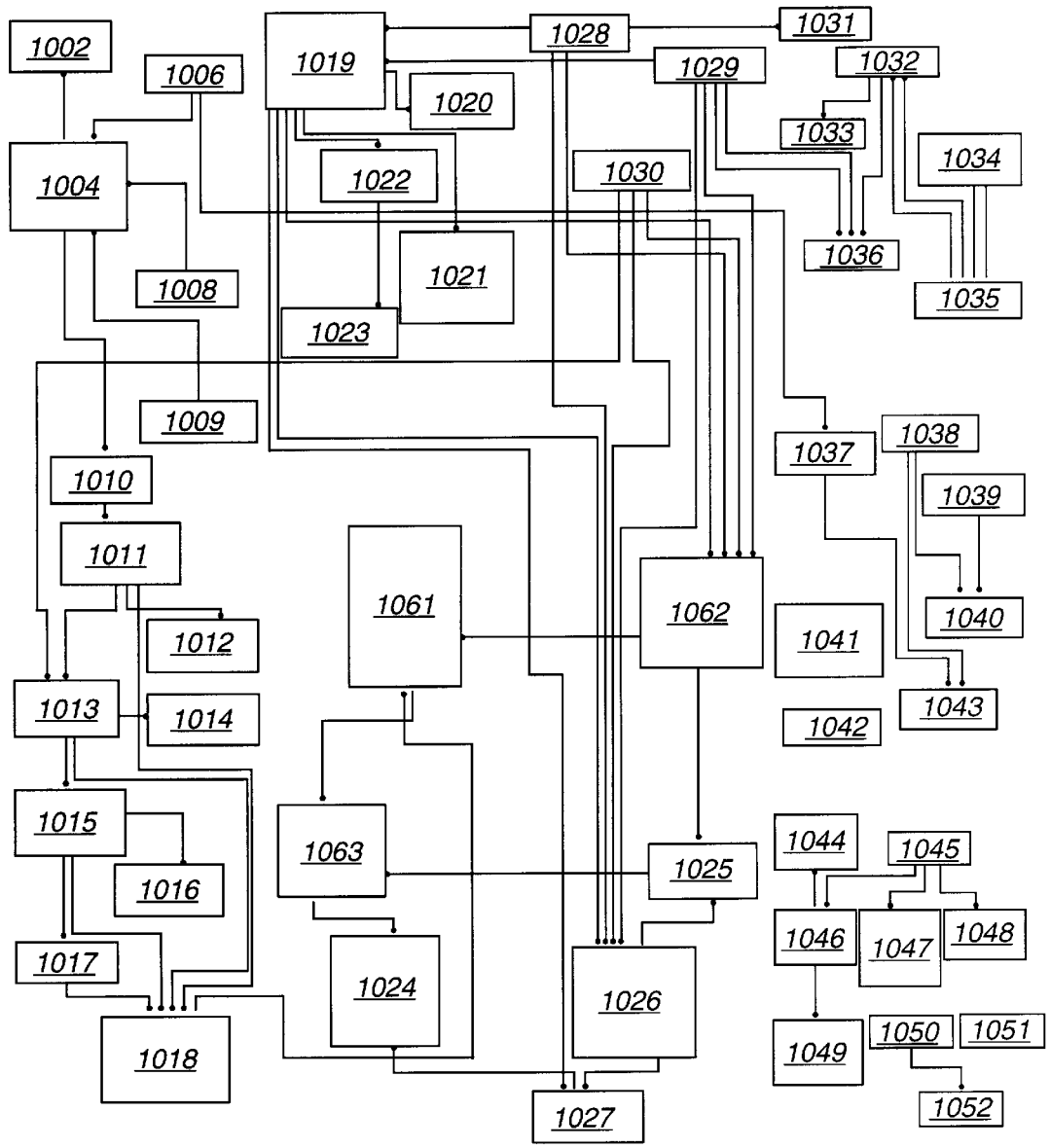
FIGS. 10A–10N are block diagrams illustrating a plurality of database tables that can be used to implement the database depicted in FIG. 1A, according to a preferred embodiment of the present invention.

FIG. 10A is a block diagram illustrating a plurality of database tables that can be used to implement the database 108, according to a preferred embodiment of the present invention. In this example of a preferred embodiment, a relational database is used to implement the database 108. However, in other embodiments, different types of databases can be used. An expanded version of the block diagram depicted in FIG. 10A is also depicted in the FIGS. 10C–10N. FIG. 10B shows how the FIGS. 10C–10N are related to each other to form the block diagram depicted in FIG. 10A.

Figure 10C:
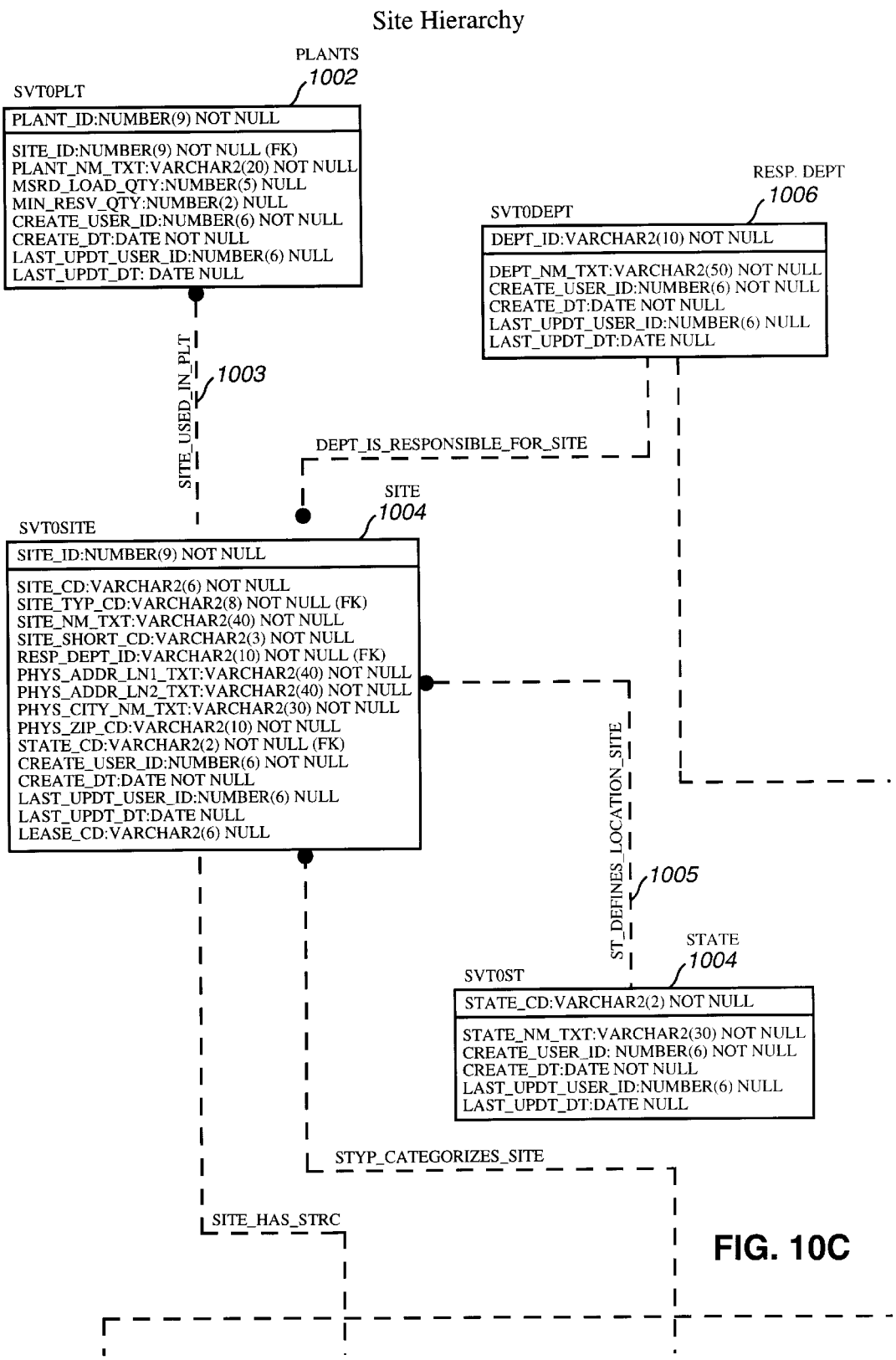

Referring now to FIG. 10C, the table 1004 represents remote sites in a portion of the database 108, referred to above as the site hierarchy repository. Each box, such as the box 1004, represents a specific database table. Accordingly, each database table comprises the names of specific data fields that are defined for each table according to a preferred embodiment of the present invention.

In this example, the names for each data field are descriptive of the type of data they represent. For example, the first three data fields in the site table 1004 are named "SITE_ID","SITE_CD and SITE_TYP_CD", respectively. These three data fields hold information related to a site identification number, a site code and a site-type code, for each site stored in the site table 1004. As such, for the most part, by reading the descriptive names of the data fields illustrated in FIGS. 10C–10N, their function and purpose would be apparent to those skilled in the relevant arts.

Typically, data fields in a relational database 108, are conceptualized as columns in a database table. Likewise, the data entries that are stored therein are conceptualized as rows in a database table. Thus, the term row is used herein to describe a single data entry within a database table. Accordingly, the term row and the term entry are synonymous. For example, a single row (or entry) in the site database table 1004, represents data describing the details of a single remote site. A complete description of the remote site comprises specific values for each of the data fields associated with the database table 1004. However, it is generally not necessary to provide values for every data field associated with a database table. This choice generally depends on each specific implementation of the present invention, which will typically define data fields as being either required or optional.

The lines interconnecting database tables shown in FIGS. 10C–10N represent relationships among tables. It should be noted that for the most part, the database tables shown in FIGS. 10C–10N are self-explanatory to those skilled in the relevant art(s). Accordingly, after reading the brief description below and examining FIGS. 10C–10N, it would be apparent to those skilled in the relevant art(s) how to implement the database 108, according to a preferred embodiment of the present invention.

As stated, interconnecting database tables shown in FIGS. 10C–10N represent relationships among the tables in the database 108. For example, a line 1003 is shown connecting the site table 1004 to the plant table 1006. In this example the plant table 1002 represents power plants that are installed in each site. The circle at the end of the line 1003 represents a one to many relationship between the rows in the site table 1004 and the rows in the plant table 1006. Accordingly, each entry in the site table 1004 may be associated with more than one entry in the plant table 1006. In other words, each site may have more than one plant installed therein.

The tables 1006 and 1008 represents pick list tables for specific data fields within the site table 1004. Specifically, the pick list tables 1006 are associated with data fields used to define a responsible department and a geographical state for a particular site listed in the table 1004.

In this example, pick list tables comprise a list of valid values that are used to fill-in particular data fields. A pick list table, such as the pick list table 1008, is used to assist in the data entry process. Typically, a pick list table is associated with one or more data fields. For example, the pick list table 1008 is associated with a data field "STATE-CD" within the table 1004 (as depiced by the dotted line 1005). Preferably, pick list tables are used during data entry to provide users with a drop-down list box, or the like, comprising textual representations of pre-defined values that can be specified for the row or rows, associated with the pick list table.

Accordingly, using the example described above, a pick list comprising states containing remote sites is presented to the user during a data entry phase. Preferably, after the user selects an item from the pick list (in this case the name of a state), the associated value is automatically entered stored in the associated row within the database table. Typically, in such cases, users are restricted to values contained in the pick list tables. That is, for such data fields that have pick lists associated with them, values other than those contained in the pick list may be considered invalid. However, this choice depends on particular implementations of the present invention.

Figure 10D:
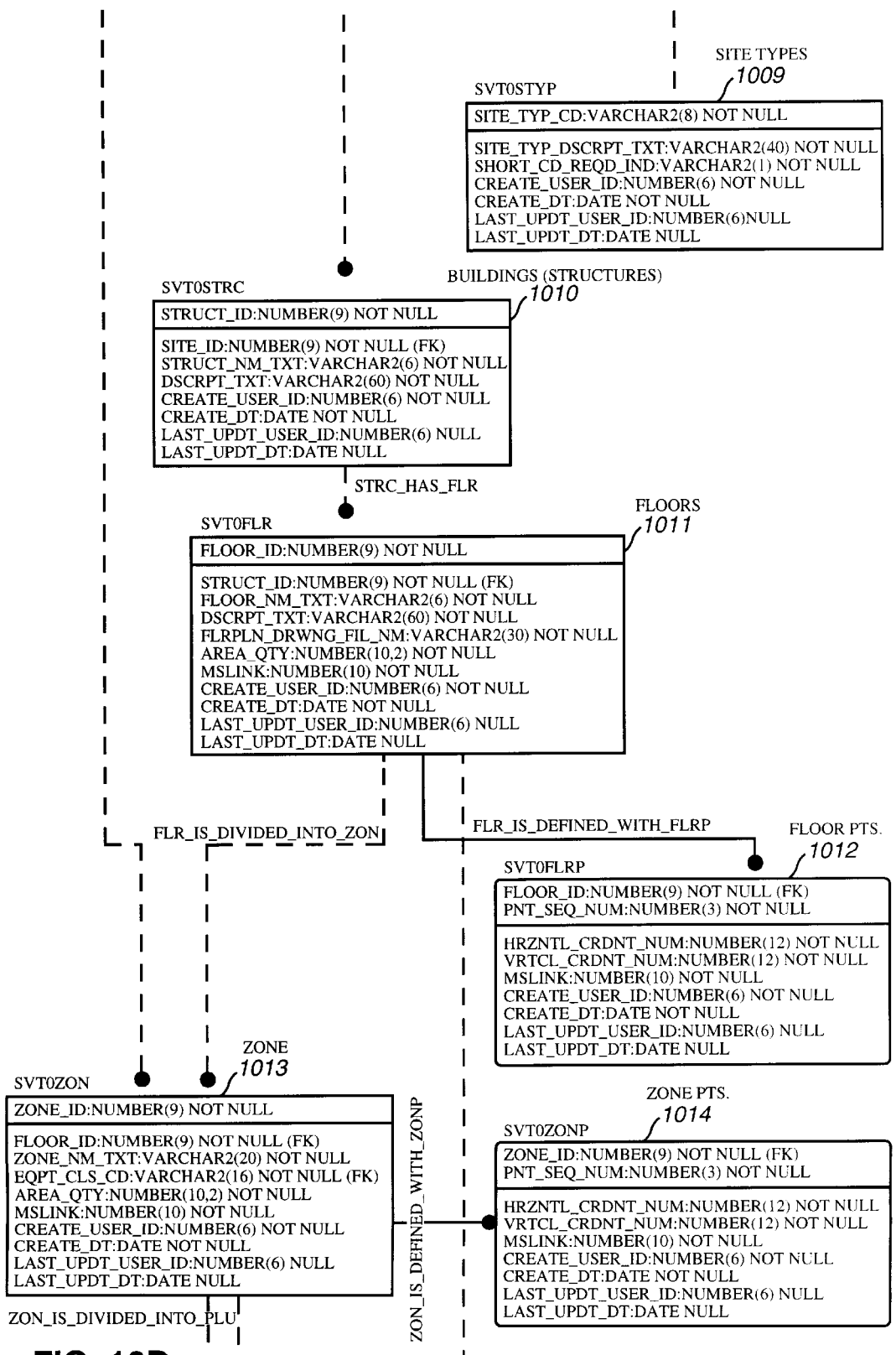

Referring now to FIG. 10D, table 1009 is a pick list table associated with the site table 1004 for providing valid values for the data field used to store site types. Table 1010 represents structures or buildings within sites. Typically, each site (represented by a single entry or row in the site table 1004), comprises multiple buildings that are each represented by a single entry in the building table 1010. Therefore, typically the building table 1010 comprises multiple rows for each row in the site table 1004.

The table 1011 represents floors within structures represented by table 1010. Typically, the floor table 1011 comprises multiple entries for each entry in the structure table 1010. The table 1012 represents floor points for the floors represented by the floor table 1010. This information is used in a system included in the preferred embodiment of the present invention for rendering graphical representations of floors, as described above. In one embodiment, each entry in the floor point table 1012 contains x-y coordinates for a portion of a polygon that is used to graphically represent the associated floor. Typically, the floor point table 1012 comprises multiple rows for each entry in the floor table 1011.

The table 1013 represents zones within floors represented by the floor table 1011. Typically, the zone table 1012 comprises multiple entries for each entry in the floor table 1011. The table 1014 represents zone points for the zones represented by the zone table 1013. This information is used in a system included in the preferred embodiment of the present invention for rendering graphical representations of zones. In one embodiment, each row in the zone point table 1014 contains x-y coordinates for a portion of a polygon that is used to graphically represent the associated zone. Typically, the zone point table 1014 comprises multiple entries for each entry in the zone table 1013.

Figure 10E:
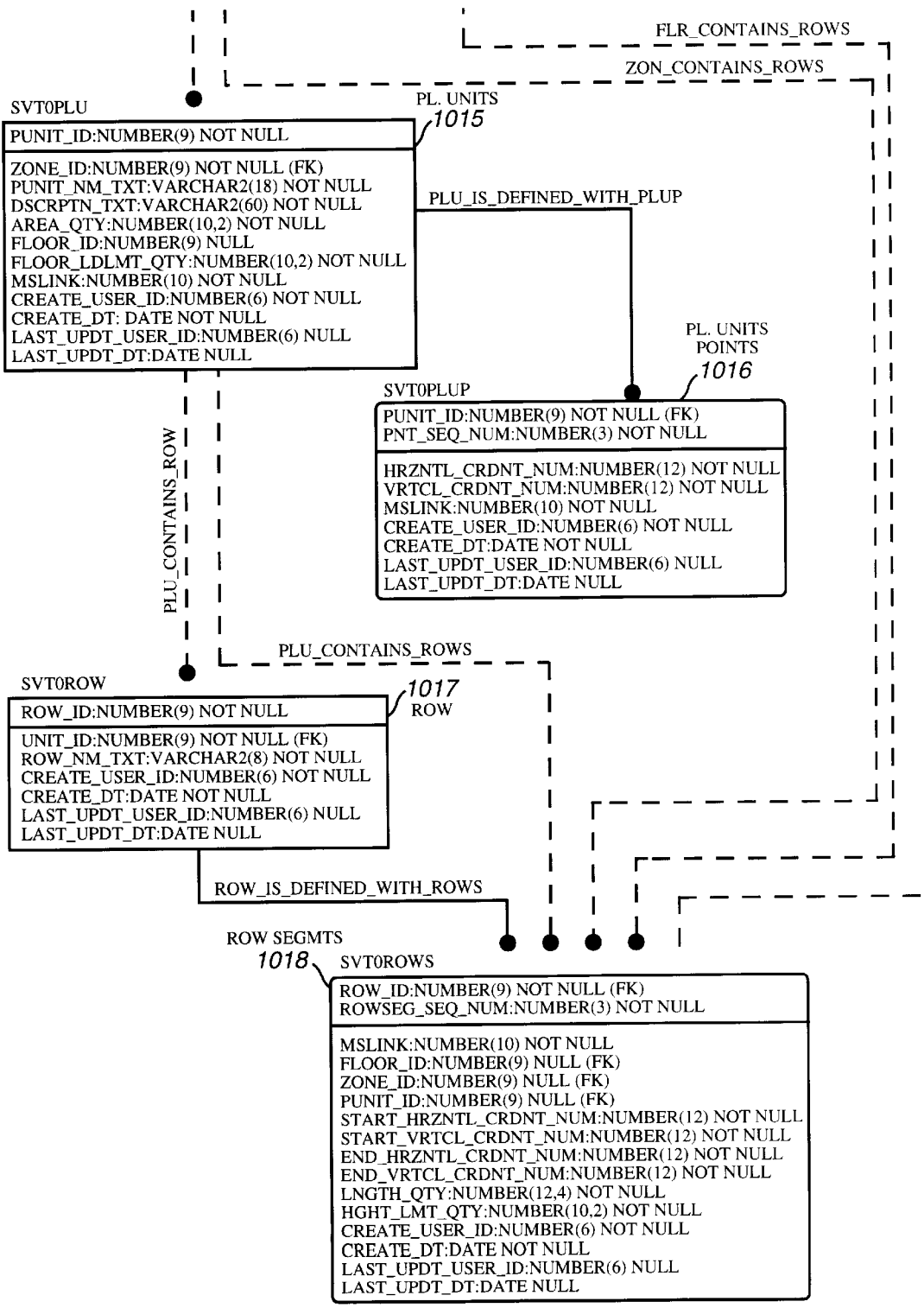

Referring now to FIG. 10E, the table 1015 represents planning units within zones represented by the zone table 1013. Typically, the planning unit table 1015 comprises multiple entries for each entry in the zone table 1013. The table 1016 represents points for planning unit table 1015. This information is typically used for rendering graphical representations of planning units. In one embodiment, each row in the planning unit point table 1016 contains x-y coordinates for a portion of a polygon that is used to graphically represent the associated planning unit. Typically, the planning unit point table 1016 comprises multiple entries for each entry in the planning unit table 1015.

The table 1017 represents rows within planning units. Typically, the row table 1017 comprises multiple entries for each entry in the planning unit table 1015. The table 1018 represents row segments within rows. Typically, the row segment table 1018 comprises multiple entries for each entry in the row table 1017. As will be shown below, configured racks are placed within row segments.

Figure 10F:
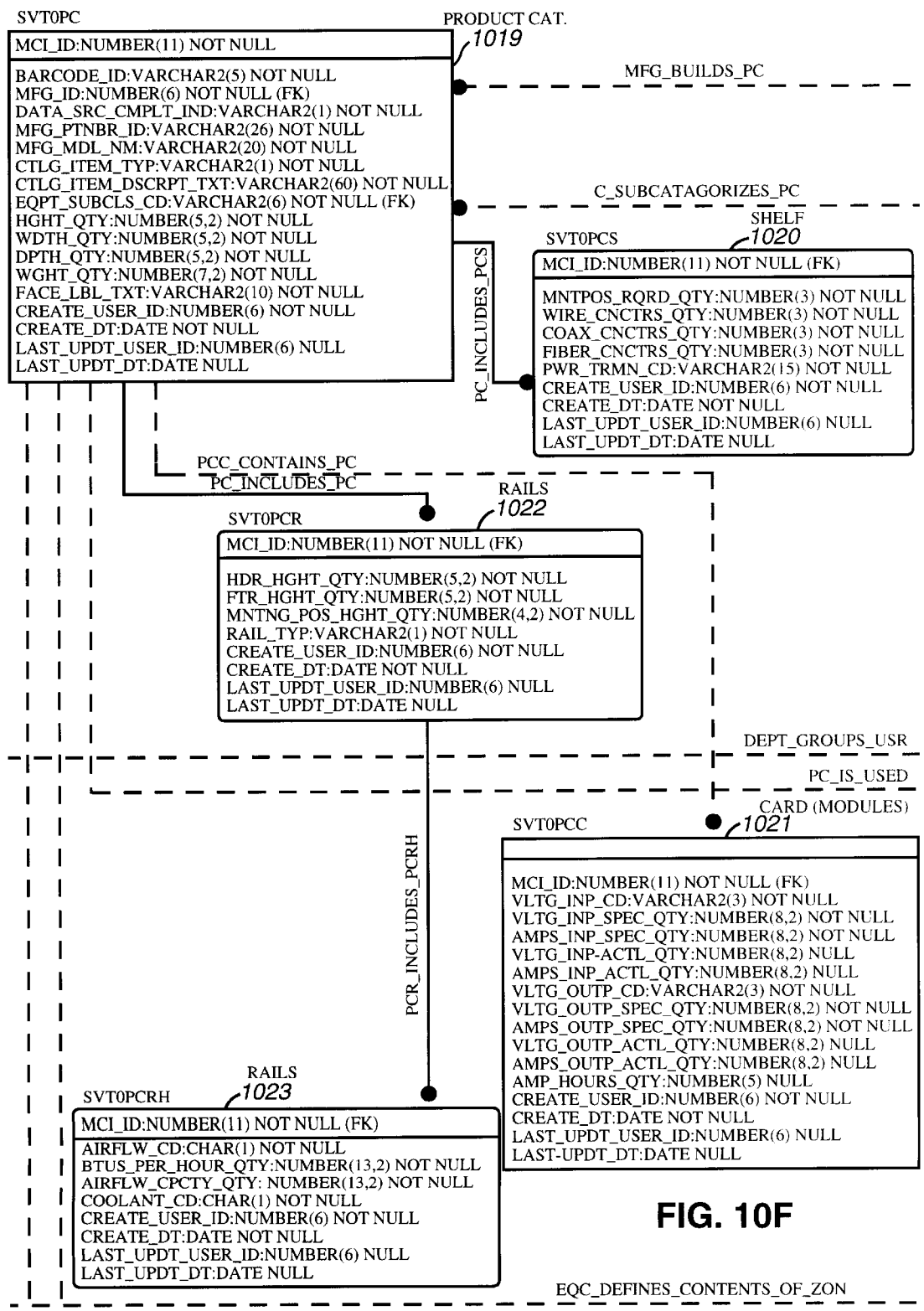
Figure 10G:
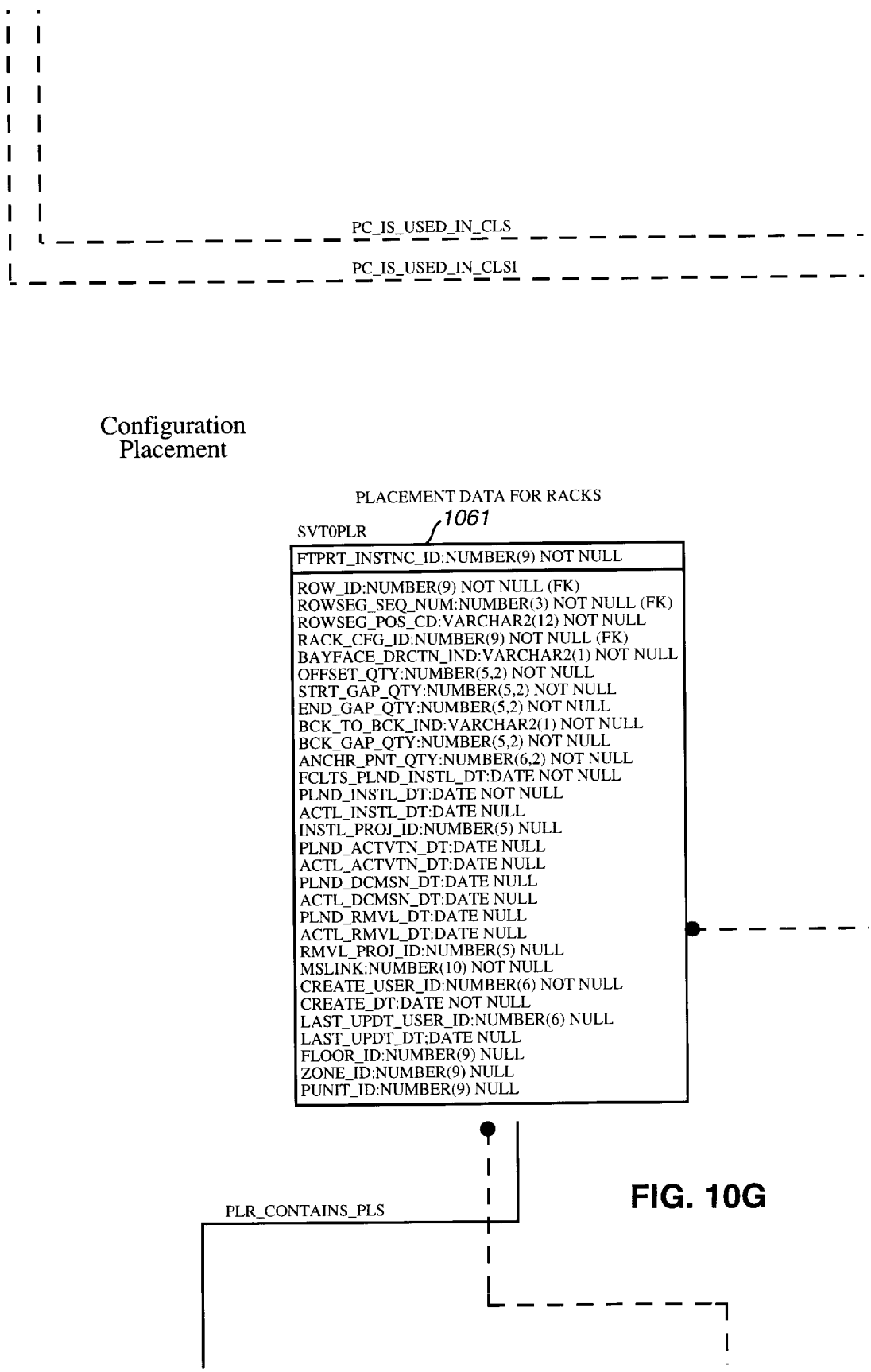
Figure 10H:
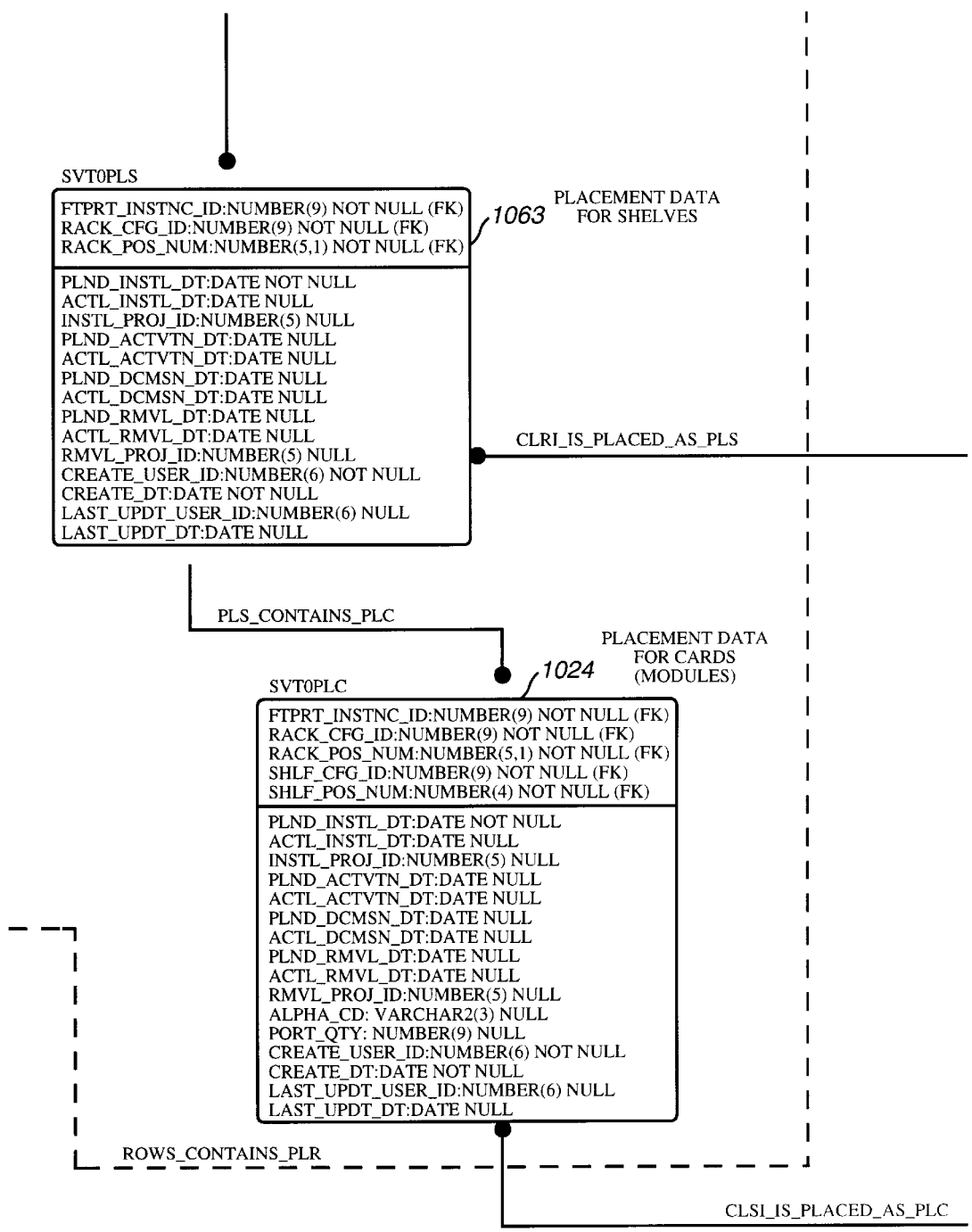

Referring now to FIG. 10F, the tables 1019–1023 is a portion of the database 108 referred to herein as the product catalog 126. Specifically, table 1019 represents components, such as modules, shelves and racks, as previously described. Data fields within the product catalog table 1019, preferably comprises detailed information about each component stored therein, such as a part number, a classification, and physical dimensions of the component. In a system included in the preferred embodiment, information common to all types of components is stored in the product catalog table 1019, and information specific to pre-defined component types are stored in the database tables 1020–1023.

For example, the shelf table 1020 represents additional information particular to shelf components. In this example, information such as the quantity of wire, coaxial and fiber connectors are stored in the shelf table 1020. The card table 1021 represents additional information particular to cards or module components. In this example, information such as actual and nominal electrical and power input and output requirements are stored in the shelf table 1020.

Likewise, the rack table 1022 represents additional information particular to racks, such as the dimensions of the rack header and rack footer areas. In addition, the HVAC rack table 1023 represents additional information about HVAC (heating, ventilation and air conditioning) racks. In this example, such additional information includes quantities for air flow, BTUs per hour, air flow capacity and coolant specifications.

Figure 10I:
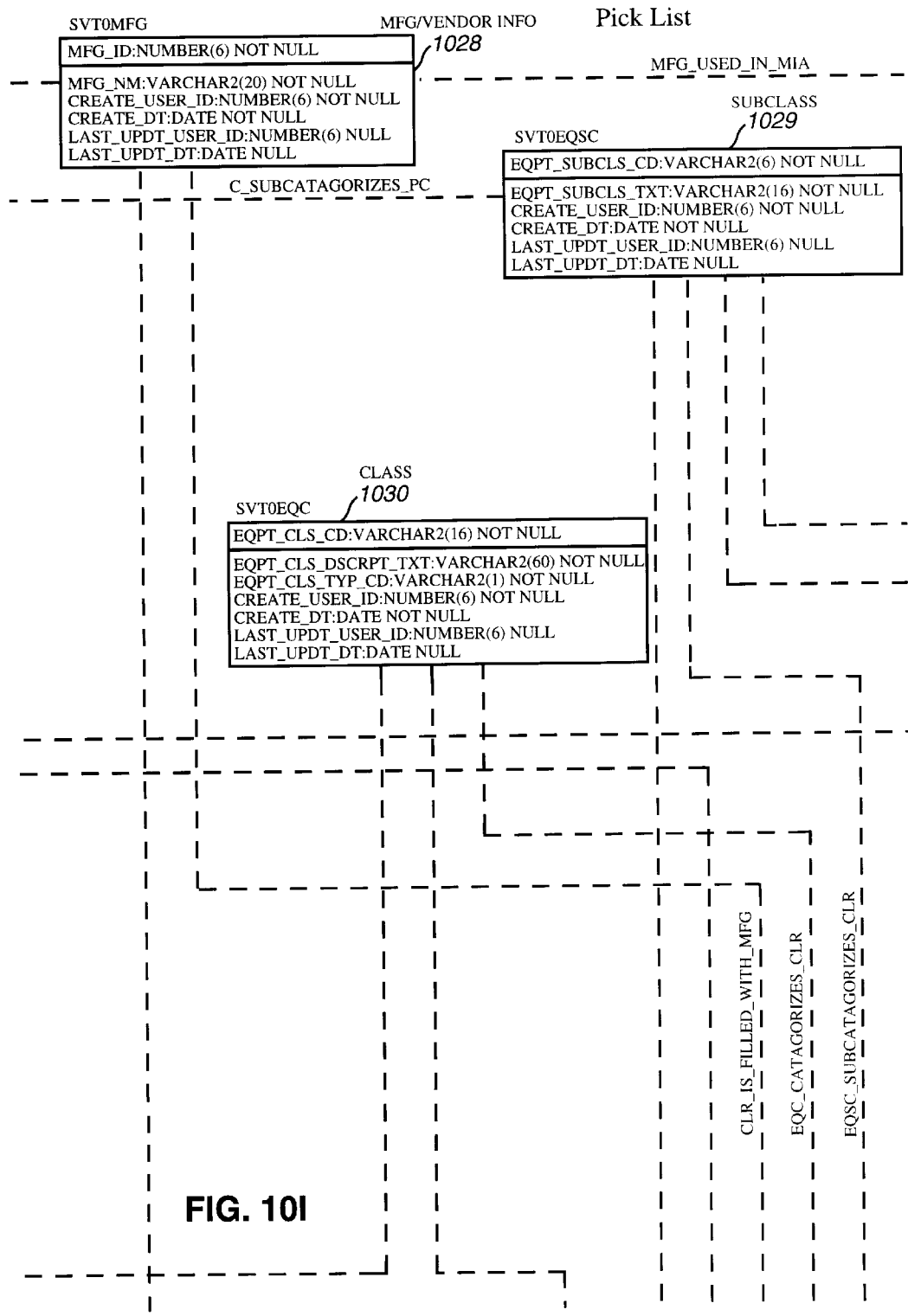
Figure 10J:
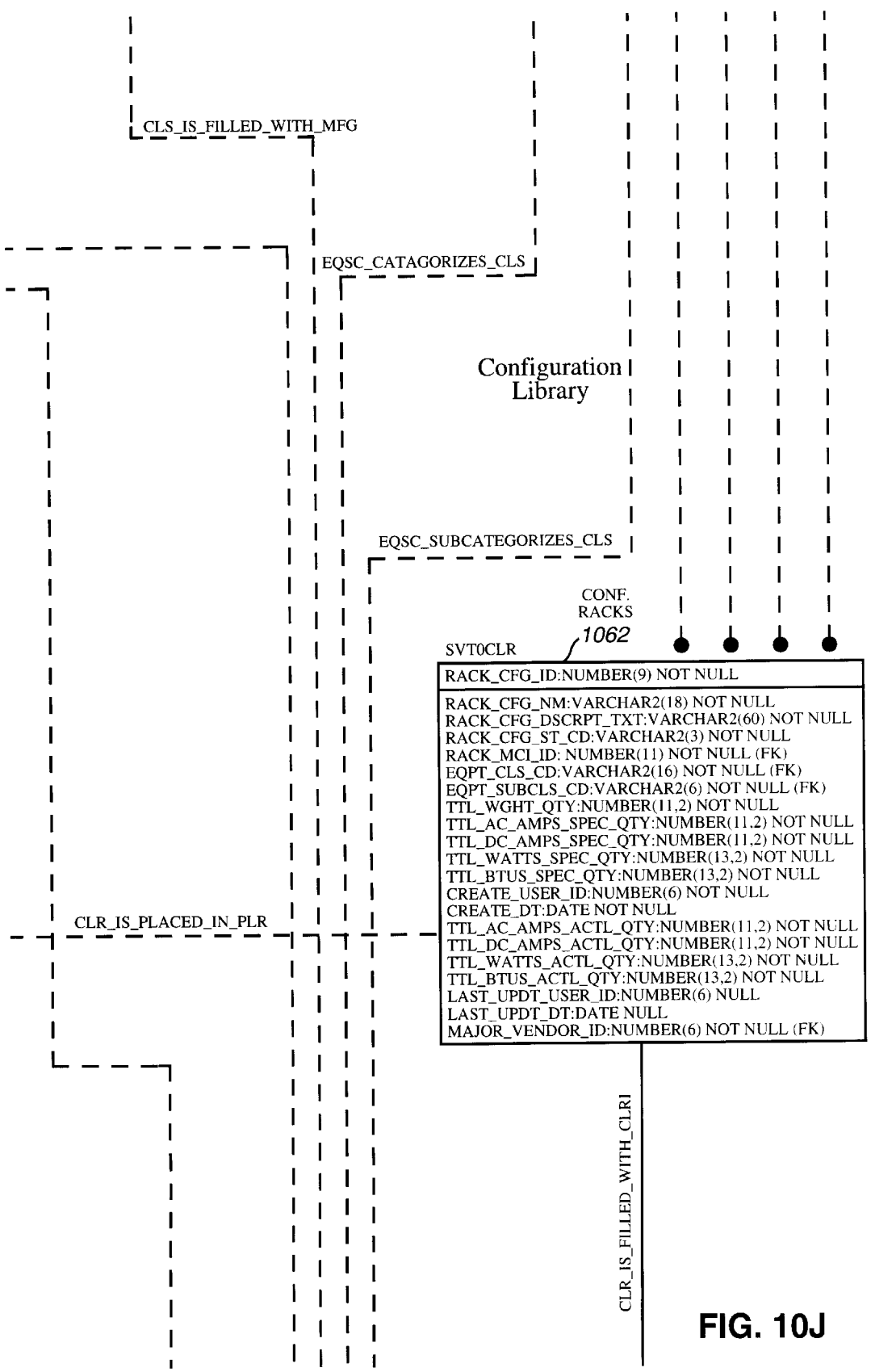
Figure 10K:
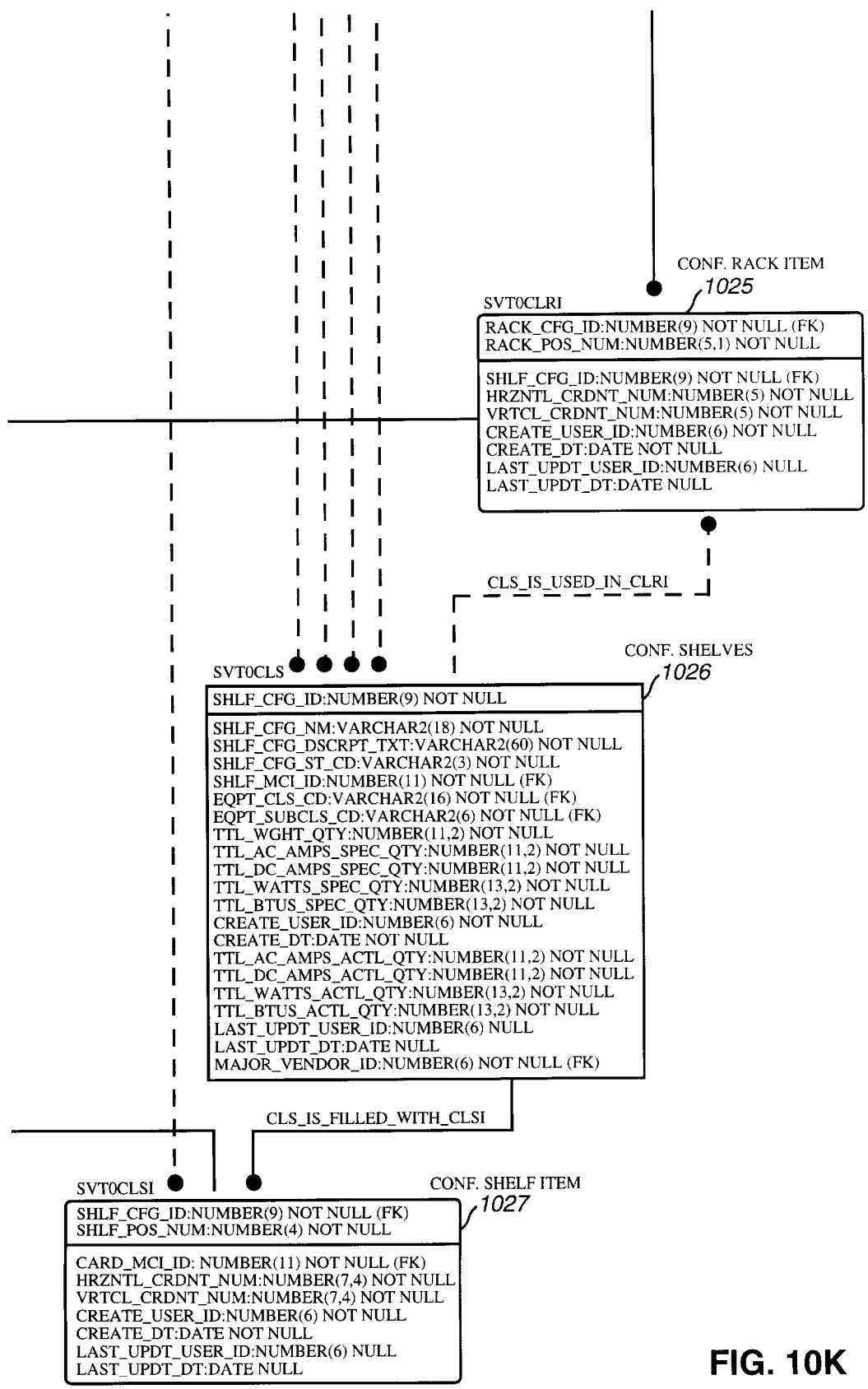

The tables in FIGS. 10G, 10H, 10J, and 10K represent portions of the database 108 referred to herein as the configuration library 128, and portions of the database used to store footprint information as described above. Specifically, the portion of the database referred to herein as the configuration library 128 is primarily represented by the configured racks table 1062 (FIG. 10J) and the configured shelves table 1026 (FIG. 10K).

As shown by the interconnecting lines, both the configured racks and the configured shelves table 1022 and 1026, respectively, are related to the product catalog table 1019. Specifically, as previously stated, configured racks and configured shelves are comprised of components (i.e. modules, shelves and racks), from the product catalog 1019, that have been interrelated. In a preferred embodiment, the interrelationships for configured racks and shelves are defined with the use of a rackface tool 112.

The configured rack item table 1025 (FIG. 10K) represents individual rack positions that are used to hold shelves, for each rack defined in the configured rack table 1022. In a preferred embodiment, configured shelves that are installed in particular rack positions are defined by the configured shelves table 1026. Accordingly, each entry in the configured shelves table 1026 can correspond with a single entry in the configured rack item table 1025. Note however, that entries within the configured shelves table 1026 can be associated with multiple entries in the configured rack item table 1025. This would be the case for example, if the same configured shelf is used in multiple rack positions in a single rack, or used in multiple racks.

The configured shelves item table 1027 (FIG. 10K) represents individual shelf positions that are used to hold modules for each shelf defined in the configured shelves table 1026. In a preferred embodiment, modules that are installed in particular shelf positions are defined by the product catalog table 1019. Accordingly, each entry in the product catalog table 1019 can correspond with an entry in the configured shelf item table 1027. It should be noted however, that in a preferred embodiment, each entry within the product catalog 1019 is typically associated with multiple entries in the configured shelf item table 1027.

A particular novel and advantageous feature of a preferred embodiment of the present invention is illustrated by the use of the placement library 130. Specifically, the placement library 130 comprises the placement data for racks table 1061 (FIG. 10G), the placement data for cards table 1024 (FIG. 10H) and the placement data for shelves table 1063 (FIG. 10H)1063. The placement data for racks table 1061 is used to place configured racks from the configured racks table 1062 in particular row segments within the row segment table 1018. In this example, one or more racks can be placed in a particular row segment. This feature is preferably implemented by creating a footprint using a placement tool as previously described above.

Preferably, specific data fields within the placement data for racks table 1061 are used for planning purposes. Such data fields are used to define specific time-related events such as planned and actual installation, activation, decommission and removal dates. This allows site planners to view data related to the configuration and placement of equipment in remote sites on a time dependent basis. Moreover, a preferred embodiment of the present invention such information is provided at the rack, shelf and module level.

As described above, the placement data for rack tables 1061 provides such time dependant data for field equipment at the rack level. Similarly, the placement data for shelves table 1063, provides such time dependant data for field equipment at the shelf level. Likewise, the placement data for modules table 1024 provides such time dependant data for field equipment at the module level.

Accordingly, using this feature of the present invention, site planners and other groups can view data related to field sites on a time-dependant basis. Preferably, each card (or module), shelf and rack that is placed within a remote site will have planned and actual installation, activation, decommission and removal dates associated with it. In this manner, users for example, can view the configuration and placement of equipment within remote field sites at a particular past, present or further date.

FIG. 10I comprises additional pick list tables from the pick list 134 portion of the database 108. Specifically, the vendor information pick list table 1028 comprises valid values used to describe pre-defined manufactures. In this example, the vender information pick list table 1028 is associated with the product catalog table 1019, the configuration racks table 1022 and the configuration shelves table 1026. Similarly, the class pick list table 1030 is used to store pre-defined values used to describe equipment classes. In this example, the class pick list table 1030 is associated with the zone table 1013, the configuration shelves table 1022 and configuration racks table 1026. Likewise, the sub-class pick list table 1029 comprises pre-defined valid values used to describe equipment sub-classes. In this example, the sub-class pick list table 1029 is associated with the product catalog 1019, the configuration shelves table 1022 and configuration racks table 1026. In addition, in this example, the pick list tables 1028, 1029 and 1030 are associated with the connection tables as described below with reference to FIG. 10L.

Figure 10L:
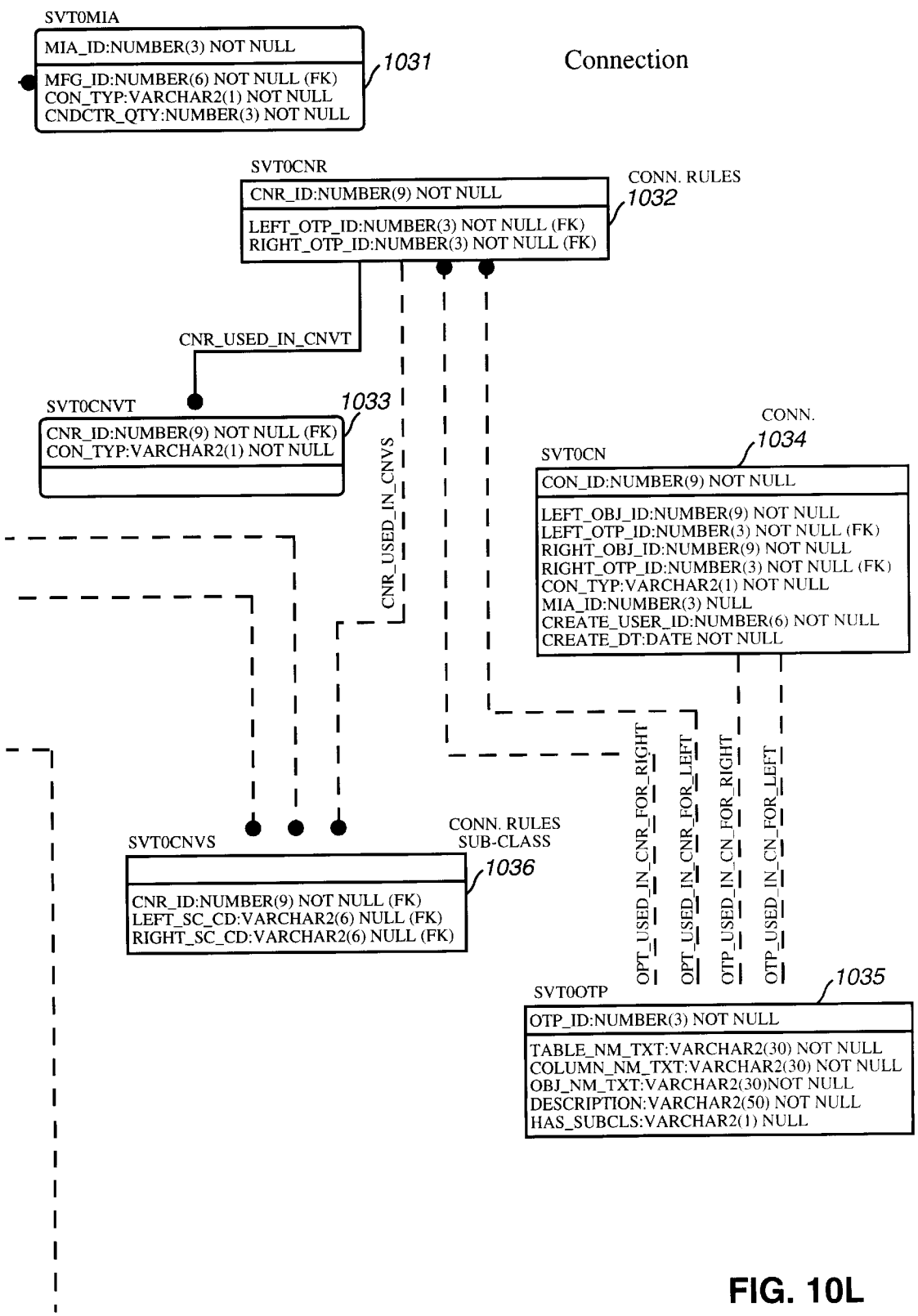

FIG. 10L comprises the connection portion 136 of the database 108. Specifically, the connection tables 1031–1035 are used to logically or physically connect one database entity with another database entity, without providing the details of the connection. For example, the connection 136 portion of the database 108 can be used to provide a logical connection between a power plant site hierarchy level and a particular footprint that draws power therefrom. In another example, the connection 136 portion of the database 108 can be used to provide a physical connection between a main power distribution bay and a particular footprint. The connection tables 1031–1035 are used in a system included in the preferred embodiment to define rules for connecting objects within the database 108 to one another. For example, the connection rules table 1032 defines what types of objects can be connected together. Similarly, the connection rules sub-class table 1036 defines what sub-classes of equipment can be connected together. The connection table 1034 is used to define what objects are connected together.

Figure 10M:
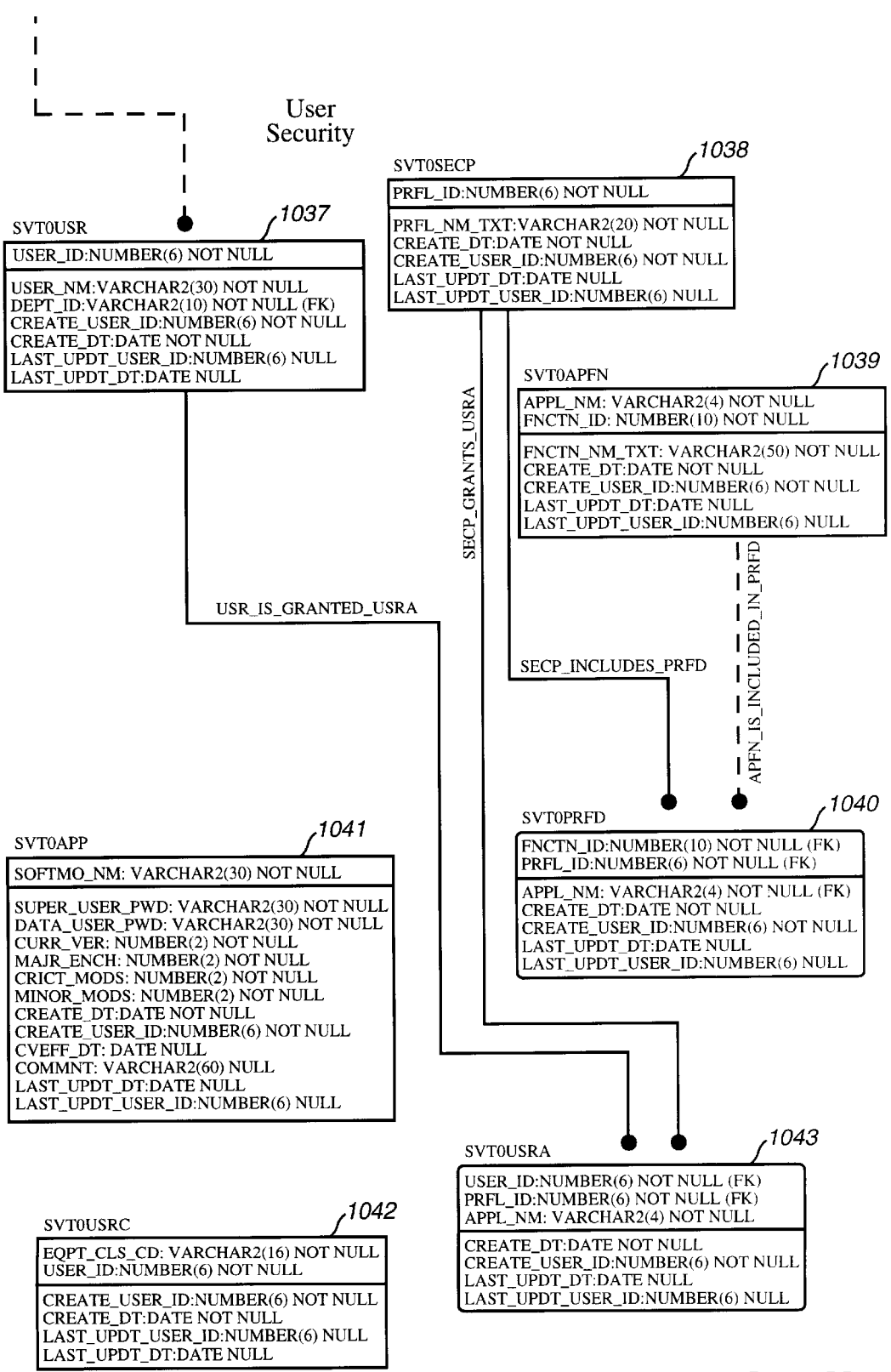
Figure 10N:
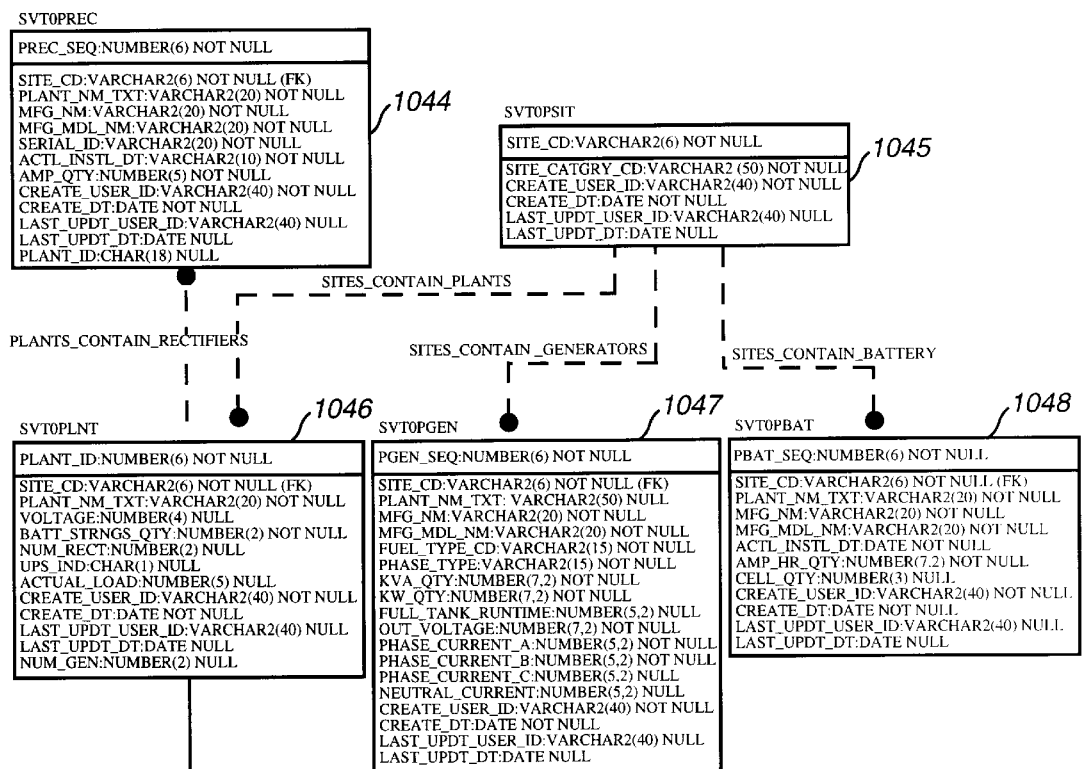
Figure 10N:
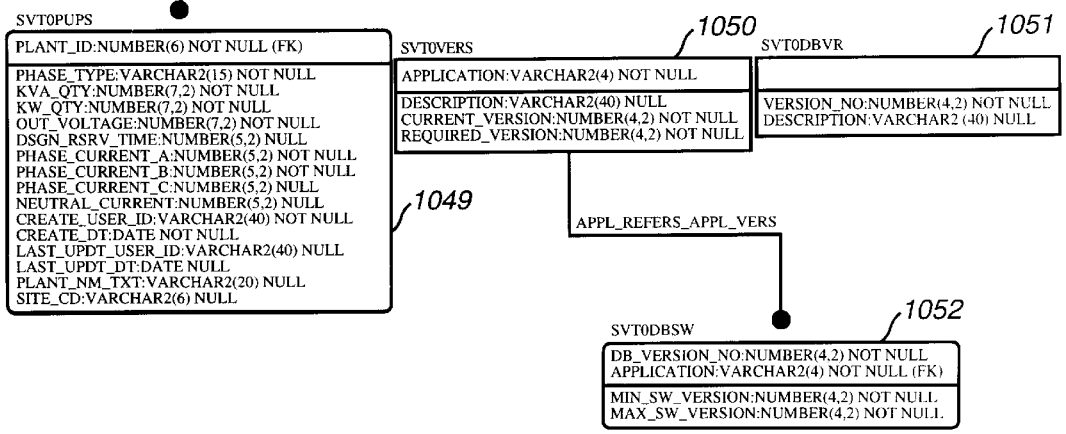

FIG. 10M comprises user security tables 1037–1043, that form the user security 132 portion of the database 108. These tables 1037–1043 are preferably used to control database access and the access to specific functions within SiteVu based on user identification. In the preferred embodiment the tables 1037–1043 describe which functions are allowed to be performed by which users. For example, in one embodiment, only users with a transmission rating are permitted to place transmission equipment in remote sites. Accordingly, such control may be implemented with the use of the user security tables 1037–1043 shown in FIG. 10M. The power tables 138 portion of the database 108, comprises the tables 1044–1052 shown in FIG. 10N are used for power planing as described below.

Figure 9:
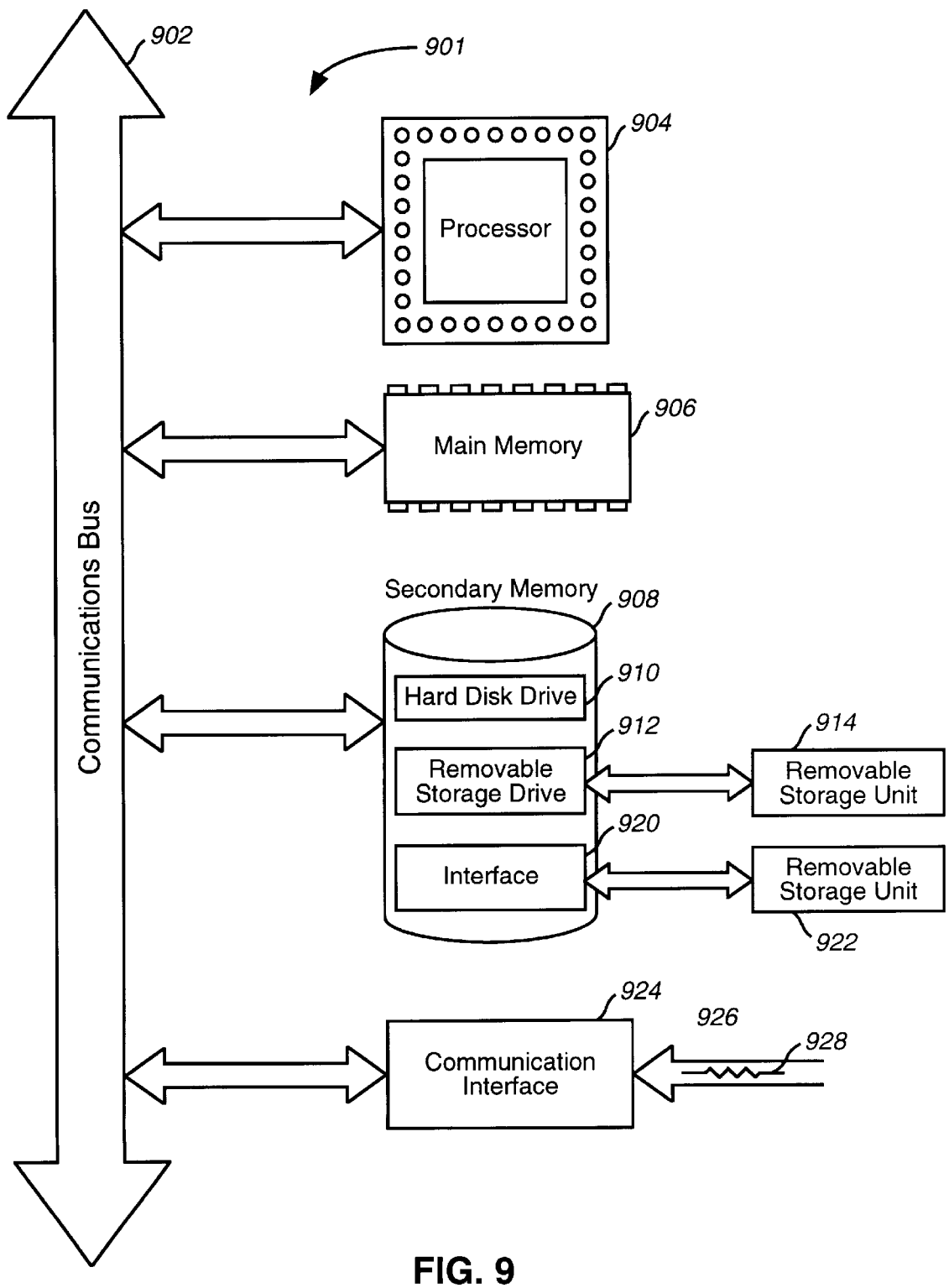
FIG. 9 is a block diagram of a computer useful for implementing components of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 901 is shown in FIG. 9. The computer system 901 includes one or more processors, such as processor 904. The processor 904 is connected to a communication bus 902. Various software embodiments are described in terms of this example computer system. After reading this description, it will become apparent to a person skilled in the relevant art how to implement the invention using other computer systems and/or computer architectures.

Computer system 902 also includes a main memory 906, preferably random access memory (RAM), and can also include a secondary memory 908. The secondary memory 908 can include, for example, a hard disk drive 910 and/or a removable storage drive 912, representing a floppy disk drive, a magnetic tape drive, an optical disk drive, etc. The removable storage drive 912 reads from and/or writes to a removable storage unit 914 in a well known manner. Removable storage unit 914, represents a floppy disk, magnetic tape, optical disk, etc. which is read by and written to by removable storage drive 912. As will be appreciated, the removable storage unit 914 includes a computer usable storage medium having stored therein computer software and/or data.

In alternative embodiments, secondary memory 908 may include other similar means for allowing computer programs or other instructions to be loaded into computer system 901. Such means can include, for example, a removable storage unit 922 and an interface 920. Examples of such can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 901.

Computer system 901 can also include a communications interface 924. Communications interface 924 allows software and data to be transferred between computer system 901 and external devices. Examples of communications interface 924 can include a modem, a network interface (such as an Ethernet card), a communications port, a PCM-CIA slot and card, etc. Software and data transferred via communications interface 924 are in the form of signals which can be electronic, electromagnetic, optical or other signals capable of being received by communications interface 924. These signals 926 are provided to communications interface via a channel 928. This channel 928 carries signals 926 and can be implemented using wire or cable, fiber optics, a phone line, a cellular phone link, an RF link and other communications channels.

In this document, the terms "computer program medium" and "computer usable medium" are used to generally refer to media such as removable storage device 912, a hard disk installed in hard disk drive 910, and signals 926. These computer program products are means for providing software to computer system 901.

Computer programs (also called computer control logic) are stored in main memory and/or secondary memory 908. Computer programs can also be received via communications interface 924. Such computer programs, when executed, enable the computer system 901 to perform the features of the present invention as discussed herein. In particular, the computer programs, when executed, enable the processor 904 to perform the features of the present invention. Accordingly, such computer programs represent controllers of the computer system 901.

In an embodiment where the invention is implemented using software, the software may be stored in a computer program product and loaded into computer system 901 using removable storage drive 912, hard drive 910 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for defining equipment down to the rackface level to be used for recording data related to the configuration of equipment comprising one or more components, wherein each component comprise rails, shelves, and modules, within field sites in a telecommunication network, said method comprising the steps of:

creating a product catalog for storing data defining the equipment; and creating a configuration library for storing data relating to the configuration of the equipment, comprising the steps of:

creating a configured shelf table for storing data related to configured shelves;

creating a configured shelves item table for storing data associated with specific shelf positions;

creating a configured rack table for storing data associated with configured racks; and creating a configured rack item table for storing data associated with specific rack positions.

2. The method of claim 1, wherein said step of creating a product catalog comprises the steps of:

defining components by specifying values for pre-defined attributes associated with said components;

storing said components in said product catalog.

3. The method of claim 2, wherein said step of creating a configuration library comprises the steps of:

defining configured equipment by selecting said components from said product catalog;

specifying interrelationships between said components; and storing said configured equipment in said configuration library.

4. The method of claim 1, wherein said step of creating a product catalog comprises the steps of:

creating a module;

creating a shelf; and creating a rail.

5. The method of claim 4, wherein said step of creating a configured shelf comprises the steps of:

selecting a said shelf from said product catalog;

selecting a said module from said product catalog;

defining a relationship between said shelf and module from said selecting steps by specifying a location for said module relative to said shelf; and specifying values for attributes associated with said configured shelf.

6. The method of claim 5, further comprising the step of repeating said step of selecting a said module and said step of defining a relationship, if another said module is to be added to said configured shelf.

7. The method of claim 4, wherein said step of creating a configured rack comprises the steps of:

selecting a said rail from said product catalog;

selecting a said configured shelf from said configuration library; and defining a relationship between said rail and configured shelf from said selecting steps by specifying a location for configured shelf relative to said rail; and specifying values for attributes associated with said configured rack.

8. The method of claim 7, further comprising the step of repeating said step of selecting a said configured shelf and said step of defining a relationship, if another said configured shelf is to be added to said rail.

9. The method of claim 5, wherein said step of defining a relationship between said shelf and module comprises the step of:

specifying a location for said module relative to said shelf by manipulating a graphical representation of said module and said shelf.

10. The method of claim 7, wherein said step of defining a relationship between said rail and configured shelf comprises the step of:

specifying a location for said configured shelf relative to said rail by manipulating a graphical representation of said shelf and said rail.

11. A computer program product, comprising a computer usable medium having computer program logic stored therein, said computer program logic for enabling a computer to record, maintain and view data representing configuration, installation and placement of equipment comprising one or more components, wherein each component comprise rails, shelves, and modules, in a field site, wherein said computer program logic comprises:

means for enabling the computer to create a product catalog for storing data defining the equipment;

means for enabling the computer to create a configuration library comprising:

means for enabling the computer to create a configured shelf table for storing data related to configured shelves;

means for creating a configured shelves item table for storing data associated with specific shelf positions;

means for enabling the computer to create a configured rack table for storing data associated with configured racks; and means for creating a configured rack item table for storing data associated with specific rack positions; and means for enabling the computer to create a footprint.

12. The computer program product of claim 11, wherein said means for enabling the computer to create a product catalog comprises:

means for enabling the computer to define components by accepting specified values for pre-defined attributes associated with said components;

means for enabling the computer to store said components in said product catalog.

13. The computer program product of claim 12, wherein said means for enabling the computer to create a configuration library comprises:

means for enabling the computer to define configured equipment by accepting selected said components from said product catalog;

means for enabling the computer to accept specified interrelationships between said components; and means for enabling the computer to store said configured equipment in said configuration library.

14. The computer program product of claim 11, wherein said means for enabling the computer to create a product catalog comprises the steps of:

means for enabling the computer to create a module;

means for enabling the computer to create a shelf; and means for enabling the computer to create a rail.

15. The computer program product of claim 14, wherein said means for enabling the computer to create a configured shelf comprises:

means for enabling the computer to accept a selection of a said shelf from said product catalog;

means for enabling the computer to accept a selection of a said module from said product catalog;

means for enabling the computer to define a relationship between said shelf and said module by accepting a specified location for said module relative to said shelf; and means for enabling the computer to accept specified values for attributes associated with said configured shelf.

16. The computer program product of claim 14, wherein said means for enabling a computer to create a configured rack comprises:

means for enabling the computer to accept a selection of a said rail from said product catalog;

means for enabling the computer to accept a selection of a said configured shelf from said configuration library;

means for enabling the computer to accept a definition of a relationship between said rail and configured shelf by accepting a specified location for said configured shelf relative to said rail; and means for enabling the computer to accept specified values for attributes associated with said configured rack.

17. The computer program product of claim 15, wherein said means for enabling the computer to define a relationship between said shelf and said module comprises:

means for enabling the computer to accept a specified a location for said module relative to said shelf by presenting a graphical representation of said module and said shelf.

18. The computer program product of claim 16, wherein said means for enabling the computer to define a relationship between said rail and configured shelf comprises:

means for enabling the computer to accept a specified a location for said configured shelf relative to said rail by presenting a graphical representation of said configured shelf and said rail.

19. A system for defining equipment comprising one or more components, wherein each component comprise rails, shelves, and modules, down to the rackface level, said system comprising:

definition means for defining components;

first storage means for storing definitions of said components;

configuration means for creating configured equipment comprising:

a shelf configuration means for defining configured shelves for storing data related to configured shelves;

a configured shelves item means for storing data associated with specific shelf positions;

a rack configuration means for defining configured racks for storing data associated with configured racks; and means for creating a configured rack item table for storing data associated with specific rack positions; and second storage means for storing data representing said configured equipment.

20. The system of claim 19, wherein said configuration means comprises:

selection means for selecting said components from said first storage means;

interrelationship means for interrelating said components.

21. The system of claim 20, wherein said definition means defines components having the types of rail, shelf and module.

22. The system of claim 21, wherein said shelf configuration means comprises:

means for selecting one or more said selected modules from said first storage means;

means for selecting a selected shelf from said first storage means;

means for placing said selected modules in specific locations within said selected shelf.

23. The system of claim 21, wherein said rack configuration means comprises:

means for selecting one or more selected configured shelves from said second storage means;

means for selecting a selected rail from said first storage means;

means for placing said selected configured shelves in specific locations within said selected rail.

* * * * *